US011178330B2

(12) United States Patent
Ota et al.

(10) Patent No.: US 11,178,330 B2
(45) Date of Patent: Nov. 16, 2021

(54) IMAGE STABILIZING APPARATUS, IMAGE PROCESSING APPARATUS, AND DETECTION METHOD

(71) Applicant: CANON KABUSHIKI KAISHA, Tokyo (JP)

(72) Inventors: Hiroki Ota, Tokyo (JP); Nobuhiko Tanaka, Tokyo (JP); Hajime Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 16/590,722

(22) Filed: Oct. 2, 2019

(65) Prior Publication Data

US 2020/0112681 A1  Apr. 9, 2020

(30) Foreign Application Priority Data

Oct. 3, 2018 (JP) .............................. JP2018-188608

(51) Int. Cl.
*H04N 5/232* (2006.01)

(52) U.S. Cl.
CPC ..... *H04N 5/23287* (2013.01); *H04N 5/23254* (2013.01); *H04N 5/23258* (2013.01)

(58) Field of Classification Search
CPC ........... H04N 5/23287; H04N 5/23254; H04N 5/23258
See application file for complete search history.

(56) References Cited

U.S. PATENT DOCUMENTS

| 2002/0097324 | A1* | 7/2002 | Onuki | H04N 5/23254 348/208.99 |
| 2008/0199170 | A1* | 8/2008 | Shibuno | G02B 7/102 396/125 |
| 2010/0134639 | A1* | 6/2010 | Takeuchi | G02B 27/646 348/208.4 |
| 2013/0141599 | A1* | 6/2013 | Kimura | H04N 5/23258 348/207.99 |
| 2014/0078326 | A1* | 3/2014 | Ozawa | H04N 5/23287 348/208.5 |
| 2014/0125828 | A1* | 5/2014 | Takeuchi | H04N 5/23287 348/208.99 |
| 2015/0146011 | A1* | 5/2015 | Tsubusaki | H04N 5/232945 348/169 |

(Continued)

FOREIGN PATENT DOCUMENTS

| JP | 2012-231262 A | 11/2012 |
| JP | 2015-161730 A | 9/2015 |

*Primary Examiner* — Lin Ye
*Assistant Examiner* — John H Morehead, III
(74) *Attorney, Agent, or Firm* — Cowan, Liebowitz & Latman, P.C.

(57) ABSTRACT

An image stabilizing apparatus comprises: a shake detector that detects shake; an image stabilizer that corrects the shake by moving a position on the basis of the shake detected by the shake detector; a position detector that detects and outputs the position of the image stabilizer; a determinator that determines an extraction timing at which to extract the position of the image stabilizer on the basis of a timing at which an image sensor which shoots an image is exposed; and an extractor that extracts the position of the image stabilizer, from the output of the position detector, at the extraction timing determined by the determinator.

25 Claims, 28 Drawing Sheets

(56) References Cited

U.S. PATENT DOCUMENTS

| | | | |
|---|---|---|---|
| 2015/0172546 A1* | 6/2015 | Takeuchi | H04N 5/23258 |
| | | | 348/208.6 |
| 2015/0350526 A1* | 12/2015 | Toyoda | H04N 5/23261 |
| | | | 348/349 |
| 2016/0006923 A1* | 1/2016 | Imamura | H04N 5/2329 |
| | | | 348/208.11 |
| 2016/0057445 A1* | 2/2016 | Tsubaki | H04N 19/521 |
| | | | 382/236 |
| 2016/0212344 A1* | 7/2016 | Takeuchi | G02B 27/646 |
| 2016/0248978 A1* | 8/2016 | Nishihara | H04N 5/2254 |
| 2016/0269606 A1* | 9/2016 | Numako | H04N 5/2353 |
| 2017/0019599 A1* | 1/2017 | Muramatsu | H04N 5/23287 |
| 2018/0247423 A1* | 8/2018 | Suzuki | G06T 5/50 |
| 2018/0309930 A1* | 10/2018 | Gyotoku | H04N 5/2254 |
| 2018/0376066 A1* | 12/2018 | Ishita | H04N 5/23258 |

* cited by examiner

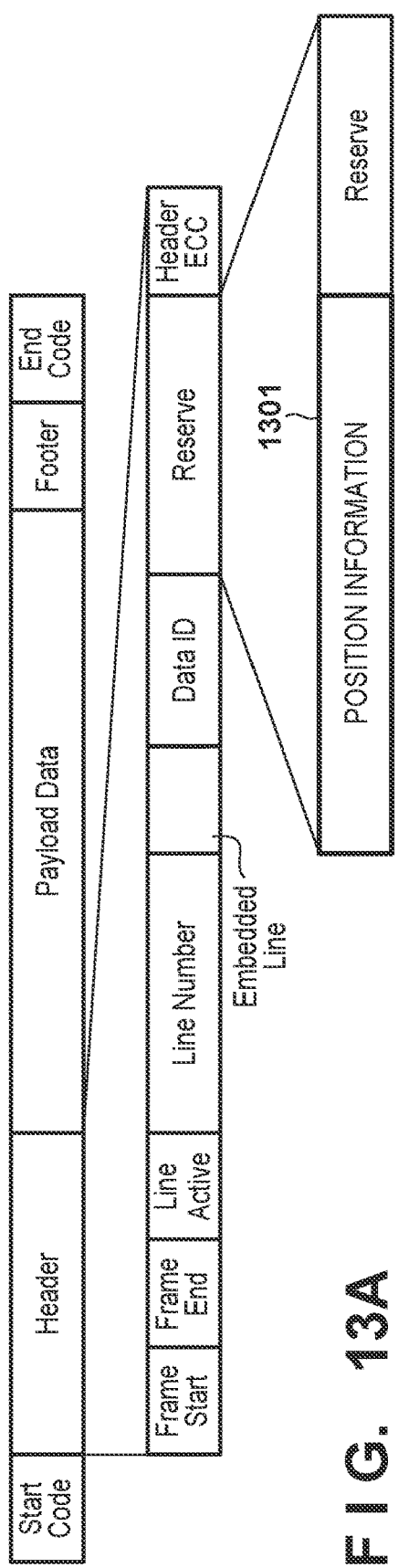

| CLASSIFICATION | | CLASSIFICATION | NUMBER OF BITS | CONTENT |
|---|---|---|---|---|
| FRAME INFORMATION | | Frame Start | 1bit | INDICATES LEADING DATA OF FRAME |
| | | Frame End | 1bit | INDICATES TERMINATING DATA OF FRAME (BECOMES 1 AT INITIAL REAR DUMMY LINE) |
| LINE INFORMATION | | Line Active | 1bit | INDICATES WHETHER LINE IS ACTIVE/INACTIVE |
| | | Line Number | 13bit | INDICATES LINE NUMBER |
| | | Embedded Line | 1bit | INDICATES EMBEDDED LINE NUMBER |
| DATA INFORMATION | | Data ID | 2bit | INDICATES DATA IDENTIFICATION |
| | POSITION INFORMATION | | 24bit | INDICATES POSITION INFORMATION OF IMAGE STABILIZATION MECHANISM |
| OTHER | | Reserve | 5bit | INDICATES EXTENSION REGION |
| | | Header ECC | 18bit | ECC OF HEADER INFORMATION |

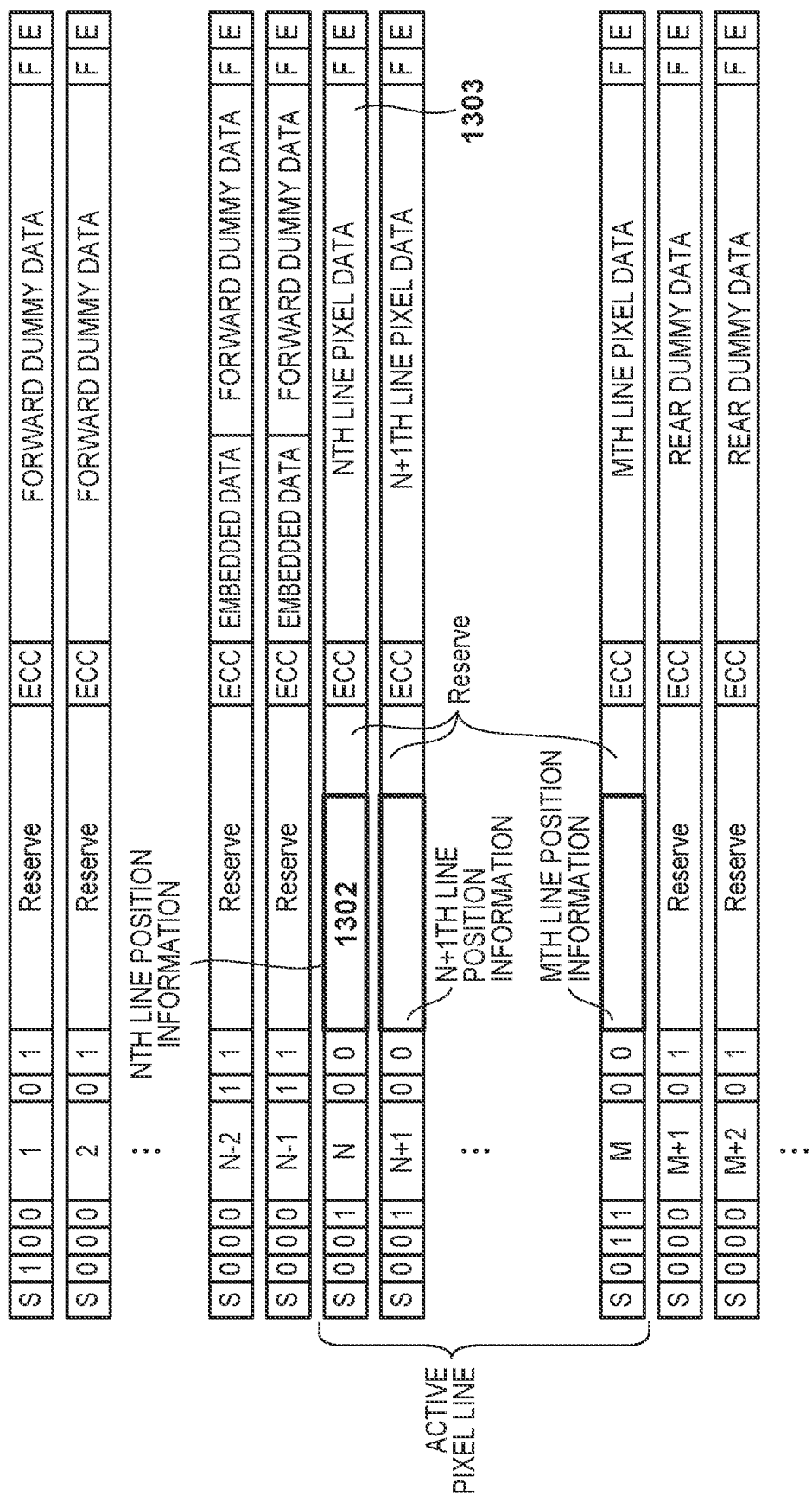

FIG. 14B

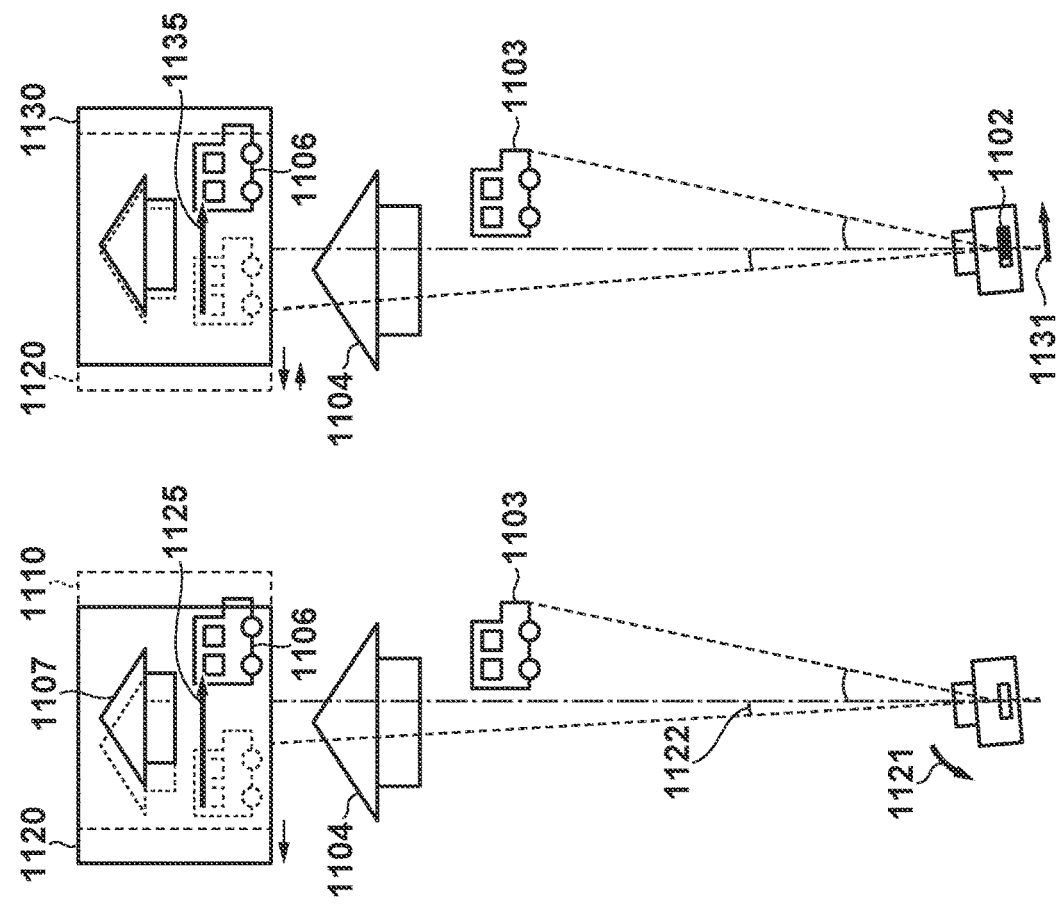
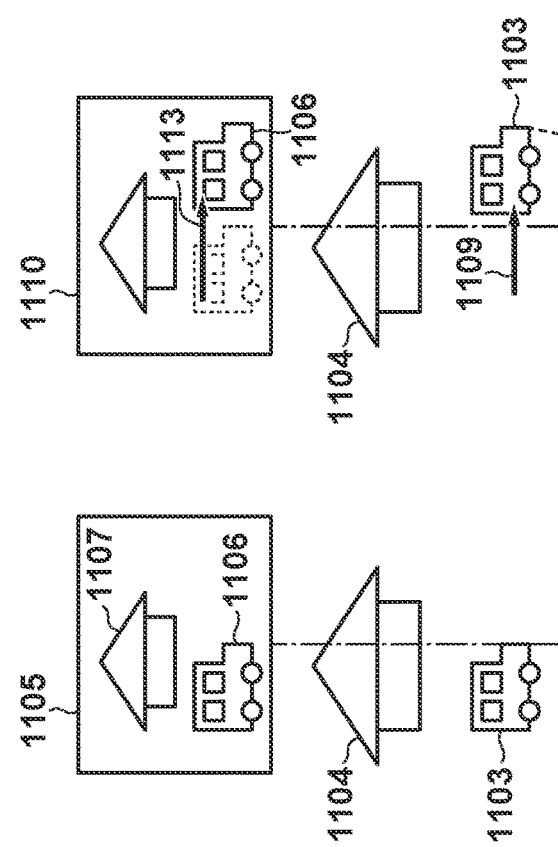

IMAGE STABILIZING APPARATUS, IMAGE PROCESSING APPARATUS, AND DETECTION METHOD

BACKGROUND OF THE INVENTION

Field of the Invention

The present invention relates to an image stabilizing apparatus, an image processing apparatus, and a detection method.

Description of the Related Art

Image capturing apparatuses, interchangeable lenses, and the like are known that have functions for detecting shake in the image capturing apparatus and correcting image blur caused by that shake using a movable optical lens or a movable image sensor. A function that corrects image blur using this method ("image stabilization function" hereinafter) is called "optical image stabilization". An angular velocity sensor (a gyrosensor), an accelerometer, or the like are typically used to detect shake in the image capturing apparatus, and the optical lens or the image sensor is driven, on the basis of a detected angular velocity or acceleration, in a direction that cancels out the image blur.

Recent years have seen increased framerates in image capturing apparatuses and advancements in image processing technologies. It is now possible to analyze difference between the positions of frame images and detect movement (a movement amount) of a subject by calculating a motion vector from the difference. An image stabilization function that cancels out image blur by changing the cutout position of each frame in a moving image on the basis of a movement amount detected in this manner is also known. This type of image stabilization function is called "electronic image stabilization". Electronic image stabilization is used in compact, lightweight image capturing apparatuses, mobile phones including image capturing apparatuses, and the like.

An image capturing apparatus can realize a variety of functions, including electronic image stabilization, by using information of the movement amount of a subject found from motion vectors. For example, moving body detection shooting, subject tracking autofocus, and the like can be realized. In moving body detection shooting, whether or not a subject is a moving body is detected, and the shutter speed, sensitivity, and the like are adjusted on the basis thereof. In subject tracking autofocus, the position of a subject is estimated from the movement amount of the subject, and the subject is brought into focus while being tracked. An automatic framing function, which shoots while automatically keeping a subject at a set size within the angle of view, and a panning shooting assist function, which helps make it easier to use the advanced shooting technique of panning shooting, can also be realized. Accurately calculating the movement amount of the subject is essential in order to effectively and accurately realize these various functions.

Japanese Patent Laid-Open No. 2015-161730 discloses a method for more accurately finding shake in an image capturing apparatus, by setting the timing at which shake is detected in the image capturing apparatus to between the exposure periods of two frames, in order to make panning shooting easier. The document proposes a panning shooting assist function that suppresses image blur in a main subject, which is the subject of the panning shooting, by using the image capturing apparatus shake detected through the stated method and a motion vector of the subject in a captured image.

Japanese Patent Laid-Open No. 2015-161730 focuses only on shake in the image capturing apparatus as obtained by a gyrosensor or the like. However, if the image capturing apparatus has an image stabilization function, accurately finding the amount of correction by an image stabilization mechanism (a correction position) is essential in order to find the movement amount of the subject more accurately, in addition to the motion vector calculated from the image and the amount of shake in the image capturing apparatus.

The relationship between the "motion vector calculated from the image", the "movement amount of the subject", the "amount of shake in the image capturing apparatus", and the "amount of correction by the image stabilization mechanism (the correction position)" will be described here with reference to FIGS. 25A to 25D. FIGS. 25A to 25D illustrate an example where an image capturing apparatus 1101 shoots two subjects, i.e., a subject 1103 and a subject 1104. An optical image stabilization mechanism 1102 is assumed here to have a configuration that corrects image blur by moving the image sensor. Although this example assumes that the image stabilization is realized by the image sensor, a method which uses an optical image stabilization lens may be employed instead.

A shot image 1105 illustrated in FIG. 25A is an image in which the subject 1103 and the subject 1104 have been shot, and the images of the subjects are a subject image 1106 and a subject image 1107, respectively. A shot image 1110, illustrated in FIG. 25B, shows a state in which, of the subject 1103 and the subject 1104 in this composition, the subject 1103 has moved to the right, from a position P1 to a position P2. At this time, the subject image 1106 in the shot image 1105 moves from the position p1 to the position p2 in the shot image 1110. A motion vector 1113 is therefore found for the subject image 1106, and a subject movement amount 1109 can be found for the subject 1103 on the basis thereof.

FIG. 25C illustrates a state where the image capturing apparatus 1101 has shaken to the left from the state illustrated in FIG. 25B (an image capturing apparatus shake amount 1121). Assuming the angular velocity of the shake in the image capturing apparatus 1101 at this time is an angular velocity 1122, a shot image 1120 is an image in which the angle of view is shifted to the left compared to the shot image 1110. Thus in the shot image 1120, the subject image 1106 and the subject image 1107 are shifted relatively to the right side, regardless of whether or not the subjects themselves have moved. As a result, the movement of the subject image 1106 in the shot image 1120 illustrated in FIG. 25C is found as a motion vector 1125. In other words, the motion vector 1125 is produced by the subject movement amount 1109, which is the movement amount of the subject 1103 itself, and the image capturing apparatus shake amount 1121, which is the amount of shake in the image capturing apparatus 1101. The motion vector 1113 of the subject image 1106 can be found by subtracting a motion vector equivalent to the image capturing apparatus shake amount 1121 from the motion vector 1125, and the subject movement amount 1109 of the subject 1103 can be found on the basis of the motion vector 1113.

Furthermore, an image capturing apparatus having an image stabilization function typically carries out image stabilization continuously, which affects the images that are shot. FIG. 25D illustrates a state where the optical image stabilization mechanism 1102 is carrying out image stabilization operations, with the image stabilization amount at that time represented by an image stabilization amount 1131. As a result, a shot image 1130 illustrated in FIG. 25D is an image shifted in the opposite direction relative to the shot image 1120 illustrated in FIG. 25C, which cancels out the image capturing apparatus shake amount 1121. As a result, the motion vector of the subject 1103 in the shot image 1130, found from the position in the subject image 1106, is a motion vector 1135.

Here, the image stabilization function having completely canceled the image capturing apparatus shake amount 1121 with the image stabilization amount 1131 is equivalent to a state where the image capturing apparatus 1101 is completely stopped. This is the same as the shot image 1110 illustrated in FIG. 25B and the shot image 1130 illustrated in FIG. 25D. In other words, the motion vector 1135 is produced only by the subject movement amount 1109. However, if the image capturing apparatus shake amount 1121 is high and thus cannot be completely corrected by the optical image stabilization mechanism 1102, the image capturing apparatus shake amount 1121 will not be completely canceled out. Furthermore, the image capturing apparatus shake amount 1121 will not be completely canceled out when the photographer intentionally pans the apparatus to track a subject while the optical image stabilization mechanism 1102 functions with a delay. As such, the motion vector 1135 calculated from the shot image 1130 is produced by the image capturing apparatus shake amount 1121 and the image stabilization amount 1131, in addition to the subject movement amount 1109. In this case, the motion vector 1113 of the subject image 1106 can be found by subtracting a motion vector equivalent to the image capturing apparatus shake amount 1121 and the image stabilization amount 1131 from the motion vector 1135, and the subject movement amount 1109 of the subject 1103 can be found on the basis of the motion vector 1113.

Thus as described above, if the image capturing apparatus has an image stabilization function, accurately finding the amount of correction by the image stabilization mechanism (the correction position) is essential in order to find the movement amount of the subject more accurately, in addition to the motion vector calculated from the image and the amount of shake in the image capturing apparatus. An invention in which the amount of correction by an optical image stabilization mechanism is extracted in synchronization with the exposure timing of each horizontal line of an image sensor, the horizontal lines where a subject (called subject horizontal lines" hereinafter), and so on has therefore also been proposed.

Meanwhile, there are cases where, in an image capturing apparatus, the image sensor and an image signal processing unit which converts pixel data from the sensor are provided on a semiconductor device or circuit board different from a semiconductor device or circuit board on which a processing unit that calculates the motion vector, movement amount, and the like of a subject are provided. In this case, image data obtained from exposure, correction position information extracted in synchronization with the exposure timing, and the like must be exchanged with the processing units located on the different circuit boards. If the image data and the correction position information are exchanged using mutually-different communication circuits, lines for those communication circuit must be provided as well. This increases the space required for wiring, the number of connector pins, and the like on the circuit boards, which makes it difficult to keep the image capturing apparatus small. The image data and the correction position information must also be synchronized, which means that the data transfer must also be synchronized between the different communication units, which complicates the processing.

It is therefore desirable that the image data obtained from exposure and the correction position information extracted in synchronization with the exposure timing be exchanged between the processing units efficiently and while conserving space.

Furthermore, if the image capturing apparatus is an interchangeable lens-type apparatus and image stabilization is realized using an image stabilization function from an image stabilization lens or the like provided on the lens side, the image stabilization amount 1131 must be transmitted from the lens side to the main body side through some kind of method in order to find an accurate subject movement amount. Thus to find an accurate subject movement amount, it is essential to find the amount of correction by the image stabilization mechanism on the lens side (the correction position) accurately and transmit that from the lens side to the main body side, in addition to the motion vector calculated from the image and the amount of shake in the image capturing apparatus.

Furthermore, in an image capturing apparatus, there are cases where the image sensor, a processing unit that calculates the motion vector, the movement amount, and so on of a subject, and an image stabilization control unit are formed on the same circuit board or in the same semiconductor device, with a shake detection unit being formed on a different circuit board. For example, the shake detection unit must detect shake in the image capturing apparatus, and the shake detection unit and the image sensor must therefore be provided on different circuit boards in a configuration that carries out image stabilization by driving a movable image sensor. The detection result from the shake detection unit must therefore be transmitted among processing units provided on different circuit boards. If a dedicated communication circuit is used to exchange the detection results from the shake detection unit at this time, the dedicated communication circuit and wiring for that communication circuit must be provided as well. This increases the space required for wiring, the number of connector pins, and the like on the circuit boards, which increases the component costs and makes it difficult to keep the image capturing apparatus small.

SUMMARY OF THE INVENTION

The present invention has been made in consideration of the above situation, and finds an accurate position of an image stabilization mechanism corresponding to the exposure of a subject in order to increase the detection accuracy of a movement amount of the subject.

According to the present invention, provided is an image stabilizing apparatus comprising: a shake detector that detects shake; an image stabilizer that corrects the shake by moving a position on the basis of the shake detected by the shake detector; a position detector that detects and outputs the position of the image stabilizer; a determinator that determines an extraction timing at which to extract the position of the image stabilizer on the basis of a timing at which an image sensor which shoots an image is exposed; and an extractor that extracts the position of the image stabilizer, from the output of the position detector, at the extraction timing determined by the determinator.

Further, according to the present invention, provided is an image processing apparatus comprising: a motion vector detector that detects a motion vector indicating movement of a subject on the basis of an image captured by an image sensor; and an acquisition circuit that acquires the motion vector detected by the motion vector detector and information from an image stabilizing apparatus; a moving amount detector that detects a movement amount of the subject on the basis of the information acquired by the acquisition circuit, wherein the image stabilization apparatus comprising: a shake detector that detects shake; an image stabilizer that corrects the shake by moving a position on the basis of the shake detected by the shake detector; a position detector that detects and outputs the position of the image stabilizer; a determinator that determines an extraction timing at which to extract the position of the image stabilizer on the basis of a timing at which an image sensor which shoots an image is exposed; and an extractor that extracts the position of the image stabilizer, from the output of the position detector, at the extraction timing determined by the determinator, and wherein the information includes a shake amount detected by the shake detector and the position of the image stabilizer extracted by the extractor.

Furthermore, according to the present invention, provided is a method of detecting a position of an image stabilizer, the method comprising: detecting shake; correcting the shake by moving the position of the image stabilizer on the basis of the detected shake; detecting and outputting the position of the image stabilizer; determining an extraction timing at which to extract the position of the image stabilizer on the basis of a timing at which an image sensor which shoots an image is exposed; and extracting, from the detected position of the image stabilizer, the position of the image stabilizer at the determined extraction timing.

Furthermore, according to the present invention, provided is a computer-readable storage medium storing a program that, in an image stabilizing apparatus including a shake detector that detects shake, an image stabilizer that corrects the shake by moving a position on the basis of the shake detected by the shake detector, and a position detector that detects and outputs the position of the image stabilizer, causes a computer to function as: a determinator that determines an extraction timing at which to extract the position of the image stabilizer on the basis of a timing at which an image sensor which shoots an image is exposed; and an extractor that extracts the position of the image stabilizer, from the output of the position detector, at the extraction timing determined by the determinator.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 13A to 13C are diagrams illustrating the configuration of the transmission packet according to the fourth embodiment.

FIG. 14B is a diagram illustrating an example of the configuration of a transmission packet according to the fifth embodiment.

FIGS. 25A to 25D are diagrams illustrating a relationship between a motion vector, an image capturing apparatus, and a subject.

DESCRIPTION OF THE EMBODIMENTS

Exemplary embodiments of the present invention will be described in detail in accordance with the accompanying drawings. The embodiments describe an image stabilizing apparatus, which stabilizes a shot image, as an example. An image stabilizing apparatus which controls the driving of a movable member or the like in an image stabilization optical system can be provided in image capturing apparatuses such as video cameras or digital cameras, optical devices including observation apparatuses such as binoculars, telescopes, and field scopes, and the like.

Figure 1:
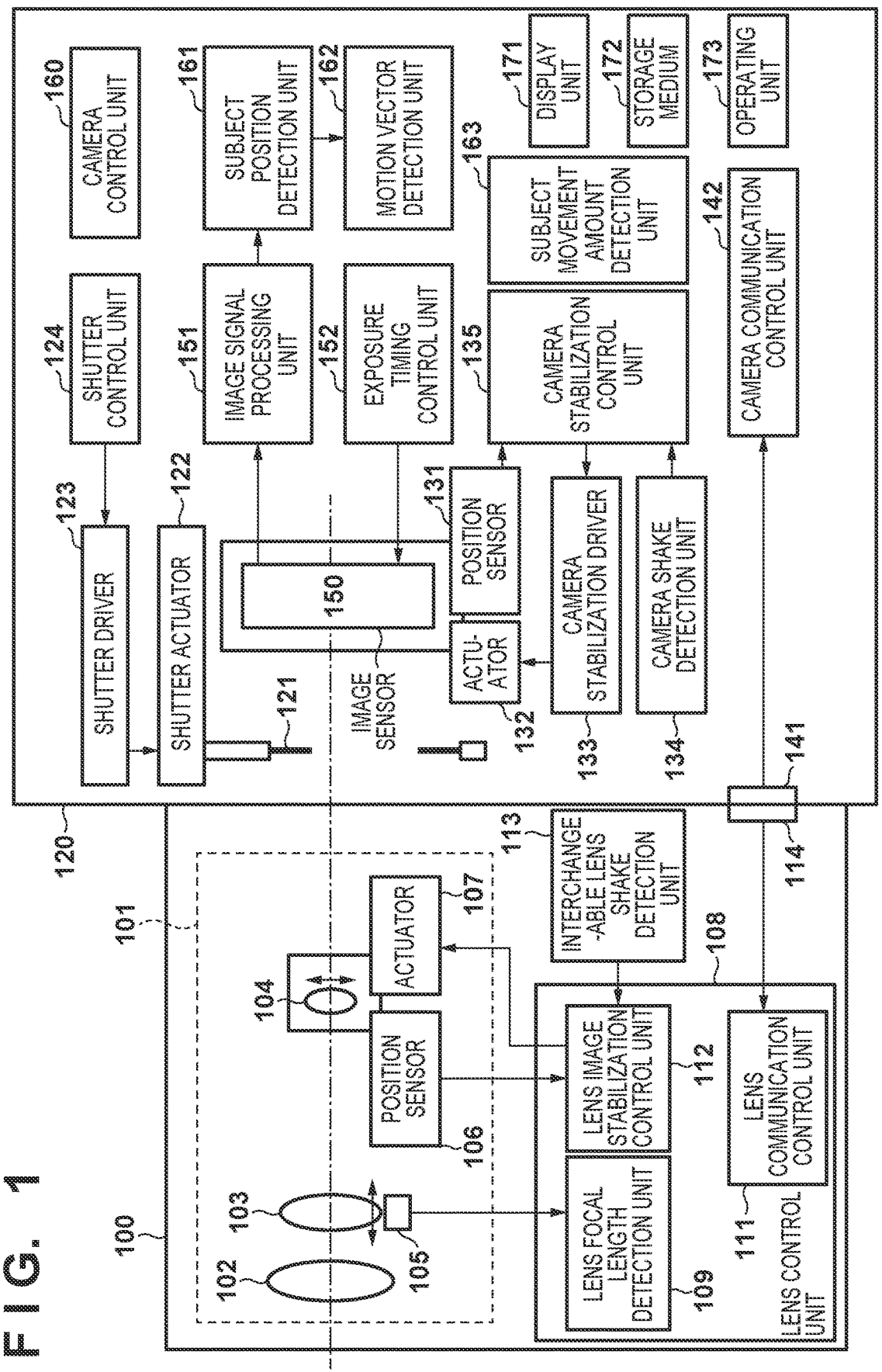
FIG. 1 is a block diagram illustrating an example of the overall configuration of an image capturing apparatus according to embodiments of the present invention.

FIG. 1 is a block diagram illustrating an example of the overall configuration of an image capturing system according to embodiments of the present invention, and illustrates the configuration of a camera body 120 (the main body of an image capturing apparatus), which is a mirrorless camera having an image stabilization function, and an interchangeable lens 100.

The interchangeable lens is an optical device that can be attached to and removed from the camera body 120, and may be any of a variety of types of lenses. The interchangeable lens 100 described here includes an imaging lens unit 101 constituted by a main optical imaging system 102, a zoom lens group 103 capable of changing the focal length, and an image stabilization lens group 104 that corrects image blur. A zoom encoder 105 detects the position of the zoom lens group 103 and outputs a detection signal to a lens focal length detection unit 109 within a lens control unit 108. The lens focal length detection unit 109 can obtain the focal length of the imaging lens unit 101 from the detection signal provided by the zoom encoder 105.

An image stabilization lens position sensor 106 detects the position of the image stabilization lens group 104, which is driven by an image stabilization lens actuator 107, and outputs a detection signal to a lens image stabilization control unit 112. An interchangeable lens shake detection unit 113 detects shake in the interchangeable lens 100, and outputs a shake detection signal (a shake amount) to the lens image stabilization control unit 112. The lens image stabilization control unit 112 carries out image stabilization operations by driving the image stabilization lens group 104 in directions perpendicular to the optical axis thereof on the basis of the shake detection signal. In other words, the lens image stabilization control unit 112 finds an amount of correction for the image stabilization lens group 104 on the basis of the position of the image stabilization lens group 104 and the shake amount in the interchangeable lens 100, and uses that amount of correction to control the image stabilization.

A mount contact unit 114 is a unit for connection with the camera body 120, and communicates with the camera body 120 under the control of a lens communication control unit 111. The lens control unit 108 also controls the focus, aperture, and the like (not illustrated here).

The camera body 120 includes a camera system control microcomputer 160 (called a "camera control unit" hereinafter), a shutter 121 used in exposure control, an image sensor 150 such as a CMOS sensor, and the like. The shutter 121 is driven by a shutter actuator 122, and the driving is controlled by a shutter control unit 124 via a shutter driver 123. A plurality of pixels are arranged in a matrix in the image sensor 150. Operation timings are set by an exposure timing control unit 152, and an image is generated by processing output signals from the image sensor 150 using an image signal processing unit 151.

A camera shake detection unit 134 detects shake in the camera body 120 and outputs a shake detection signal to a camera stabilization control unit 135. The image sensor 150 is driven in directions perpendicular to the optical axis by a camera stabilization actuator 132, and the position of the sensor is output to the camera stabilization control unit 135 by a camera stabilization position sensor 131. The camera stabilization control unit 135 performs image stabilization control of the camera body 120 by finding an amount of correction on the basis of the output from the camera shake detection unit 134 and the position information of the image sensor 150, and driving the camera stabilization actuator 132 on the basis of that amount of correction using a camera stabilization driver 133.

A display unit 171 includes a display device, such as a liquid crystal panel (LCD), that makes displays for a user to monitor the image he or she intends to shoot with the camera, displays for the user to confirm images that have been shot, and the like. A storage medium 172 is a recording medium, such as a memory card, that records the data of shot images. An operating unit 173 includes a power switch, a release switch, a switch for setting various modes, and the like.

A mount contact unit 141 is a connection unit provided for connecting the camera body 120 and the interchangeable lens 100. The lens communication control unit 111 and a camera communication control unit 142 communicate at predetermined timings through the mount contact unit 114 and the mount contact unit 141.

A subject position detection unit 161 detects various types of subjects, such as a main subject and a background, from an image output from the image signal processing unit 151. A motion vector detection unit 162 calculates a motion vector of a subject from differences in the image data between a plurality of frames. A subject movement amount detection unit 163 detects movement (a movement amount) of a subject on the basis of the shake detection signal from the camera shake detection unit 134, the motion vector from the motion vector detection unit 162, and the position information from the camera stabilization position sensor 131.

The camera body 120 also includes various other control blocks, such as a white balance control unit, but these have not been illustrated for the sake of simplicity. Furthermore, during image stabilization, detection and correction processes are executed for two orthogonal axes, e.g., in horizontal and vertical directions. However, these processes use the same configurations, and thus the following descriptions will focus on only a single axis.

Figure 2:
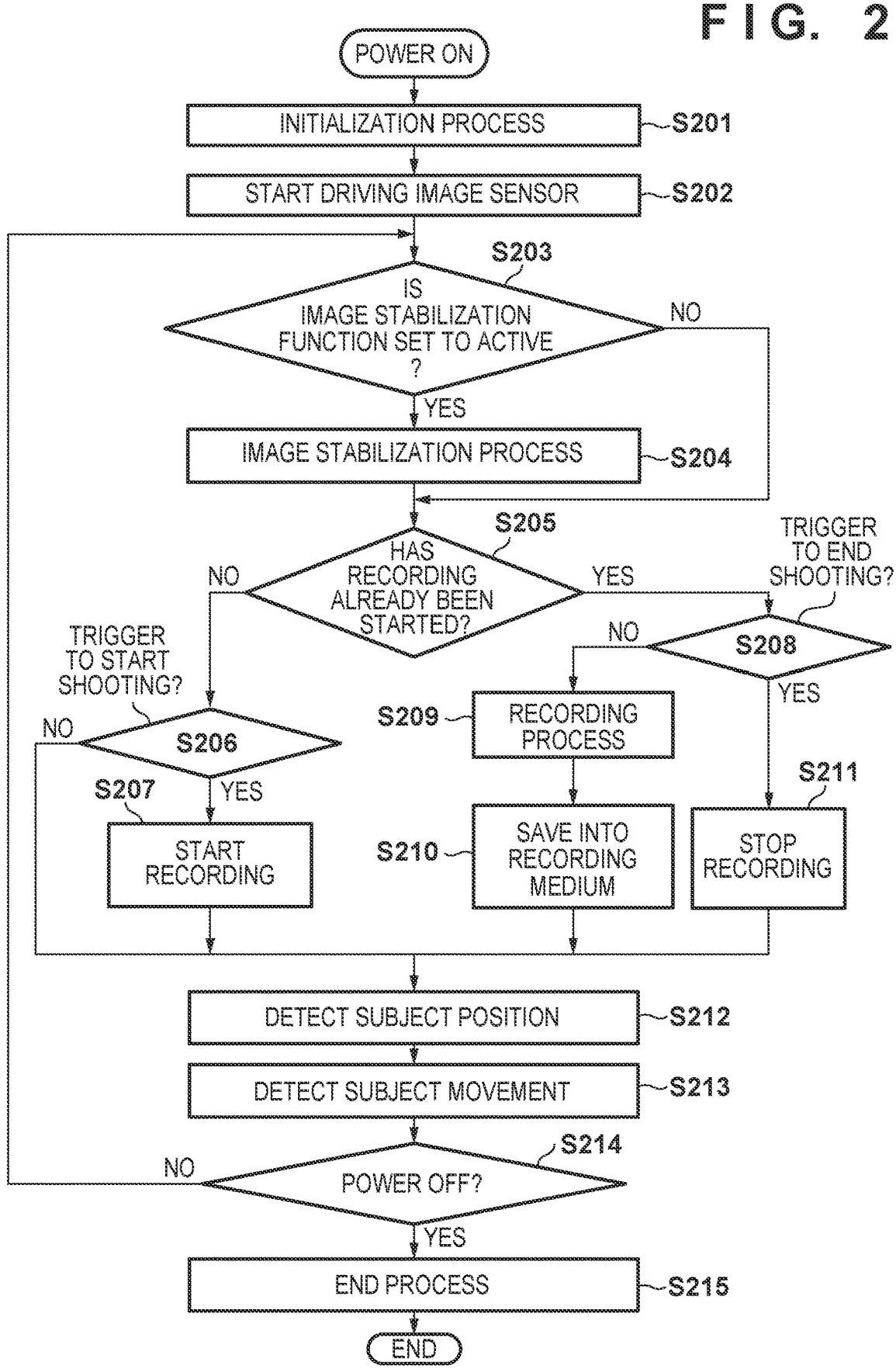
FIG. 2 is a flowchart illustrating the flow of shooting by the image capturing apparatus according to embodiments.

FIG. 2 is a flowchart illustrating the flow of shooting by the image capturing apparatus configured as described above, according to the present invention. The flow of shooting by the image capturing apparatus will be described next with reference to FIG. 2.

Once the image capturing apparatus is turned on, first, an initialization process for making shooting preparations is carried out (step S201). Having finished the initialization process, the image capturing apparatus starts driving the image sensor 150, and starts obtaining a subject image (step S202). At this time, if the image stabilization function is set to active (YES in step S203), an image stabilization process is carried out by the various image stabilization mechanisms (step S204), after which the process moves to step S205. If the image stabilization function is not active, the process moves to step S205 without carrying out the image stabilization process.

Next, in step S205, the image capturing apparatus determines whether or not recording has been started. If recording has not been started, the process moves to step S206, where it is determined whether or not a trigger to start shooting has been produced by the release button in the operating unit 173 being operated. If the trigger to start shooting has been produced, the process moves to step S207. Recording is started, and the process moves to step S212. However, if the trigger to start shooting has not been produced, the process moves directly to step S212.

If the recording has already been started, the process moves to step S208, where it is determined whether or not a trigger to end shooting has been produced by the release button of the operating unit 173 being operated. If the trigger to end shooting has not been produced, the process moves to step S209, where a recording process is carried out. Then, the shot image is saved into the recording medium in step S210, after which the process moves to step S212. On the other hand, if the trigger to end shooting has been produced, the process moves to step S211, where the recording is stopped. The process then moves to step S212.

In this manner, when a trigger is produced by the release button being operated while recording has not yet been started, the recording is started. The recording process is continued until the trigger is produced again, whereupon the shot image is saved into the recording medium. When the trigger is produced again after the recording was started, the recording is stopped.

In step S212, the position of a subject in the image obtained by the image sensor 150 is detected. In step S213, movement of the subject is detected on the basis of the position of the subject detected previously and the position of the subject detected at present. Note that the present invention assumes that the subject position detection process (step S212) and the subject movement detection process (S213) are carried out continuously while the image sensor 150 is operating, regardless of whether or not recording is taking place. Such being the case, the position and movement of the subject can be detected and predicted even while in a waiting state, which makes it possible to realize various shooting functions.

In step S214, it is determined whether or not an operation for turning the power off, such as the power button in the operating unit 173 being operated, has been made. If the power has not been turned off, the process returns to step S203, and the above-described processing is repeated. However, if the power has been turned off, the end process is performed in step S215. The image capturing apparatus is turned off, and the flow of the shooting ends.

First Embodiment

Figure 3:
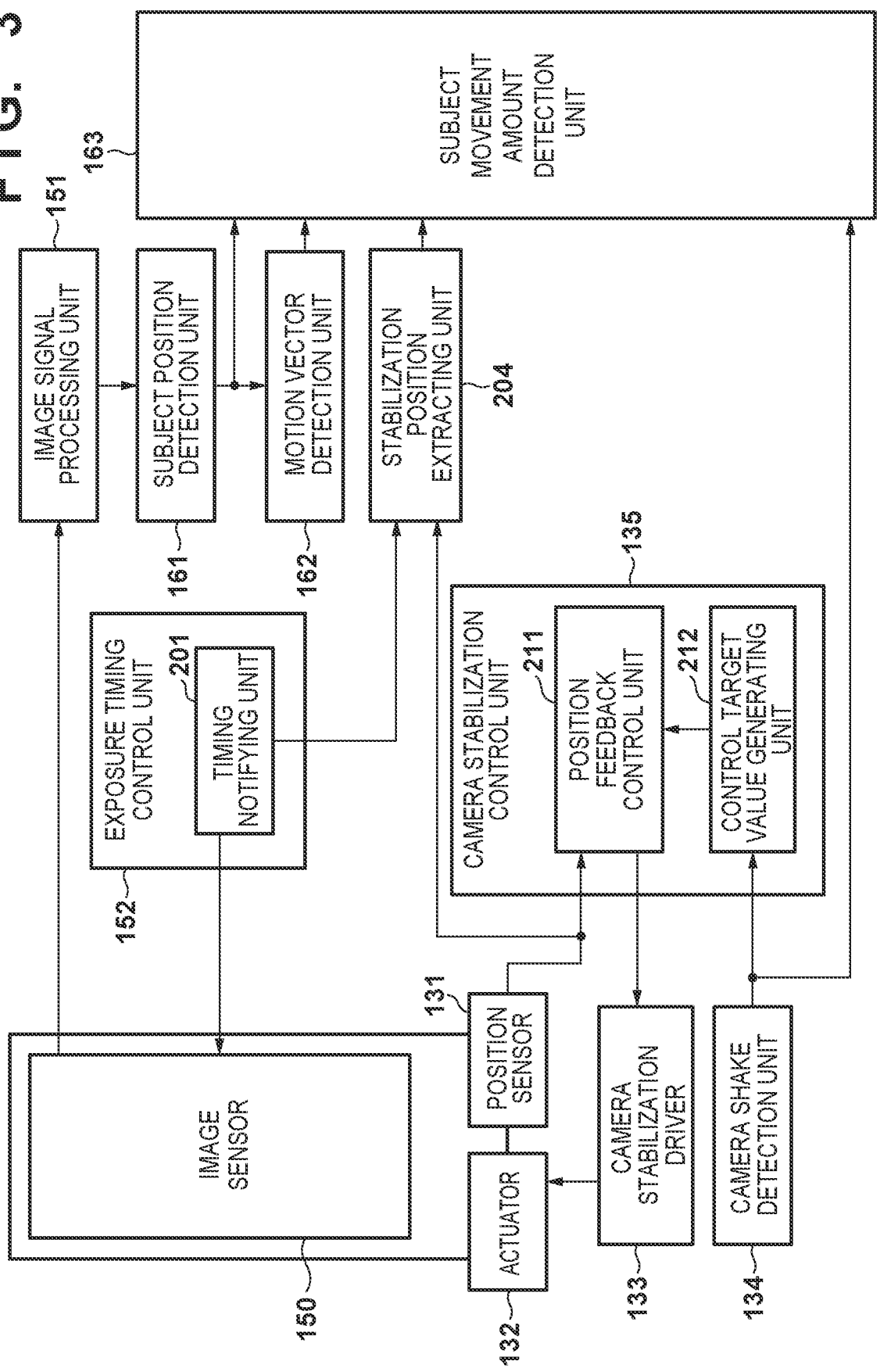
FIG. 3 is a block diagram illustrating, in detail, a configuration involved in a subject movement detection process according to a first embodiment.

FIG. 3 is a block diagram illustrating, in further detail, a configuration used for a subject movement detection process according to a first embodiment of the present invention. Note that elements that are the same as those shown in FIG. 1 are given the same reference numerals. Furthermore, the elements in FIG. 1 not directly related to the subject movement detection process according to the first embodiment are not shown.

The camera stabilization control unit 135 includes a position feedback control unit 211 and a control target value generating unit 212. The control target value generating unit 212 generates a control target value, for carrying out position feedback control with the position feedback control unit 211, on the basis of the output from the camera shake detection unit 134. The position feedback control unit 211 finds a target position for the image sensor 150, and calculates an operation amount, on the basis of the control target value and the position information from the camera stabilization position sensor 131, and then carries out the position feedback control, which controls the driving of the camera stabilization actuator 132. An image stabilization function that suppresses image blur, a smooth panning operation, and the like can be realized using the control target value generated by the control target value generating unit 212.

A stabilization position extracting unit 204 extracts a value from the output of the camera stabilization position sensor 131 at a specific timing. That timing is set by a timing notifying unit 201 included in the exposure timing control unit 152. An output from the timing notifying unit 201 depends on shooting conditions or the like set in the exposure timing control unit 152. This will be described in greater detail later. The subject movement amount detection unit 163 detects the movement amount of the subject on the basis of the outputs from the subject position detection unit 161, the motion vector detection unit 162, the stabilization position extracting unit 204, and the camera shake detection unit 134.

Figure 4:
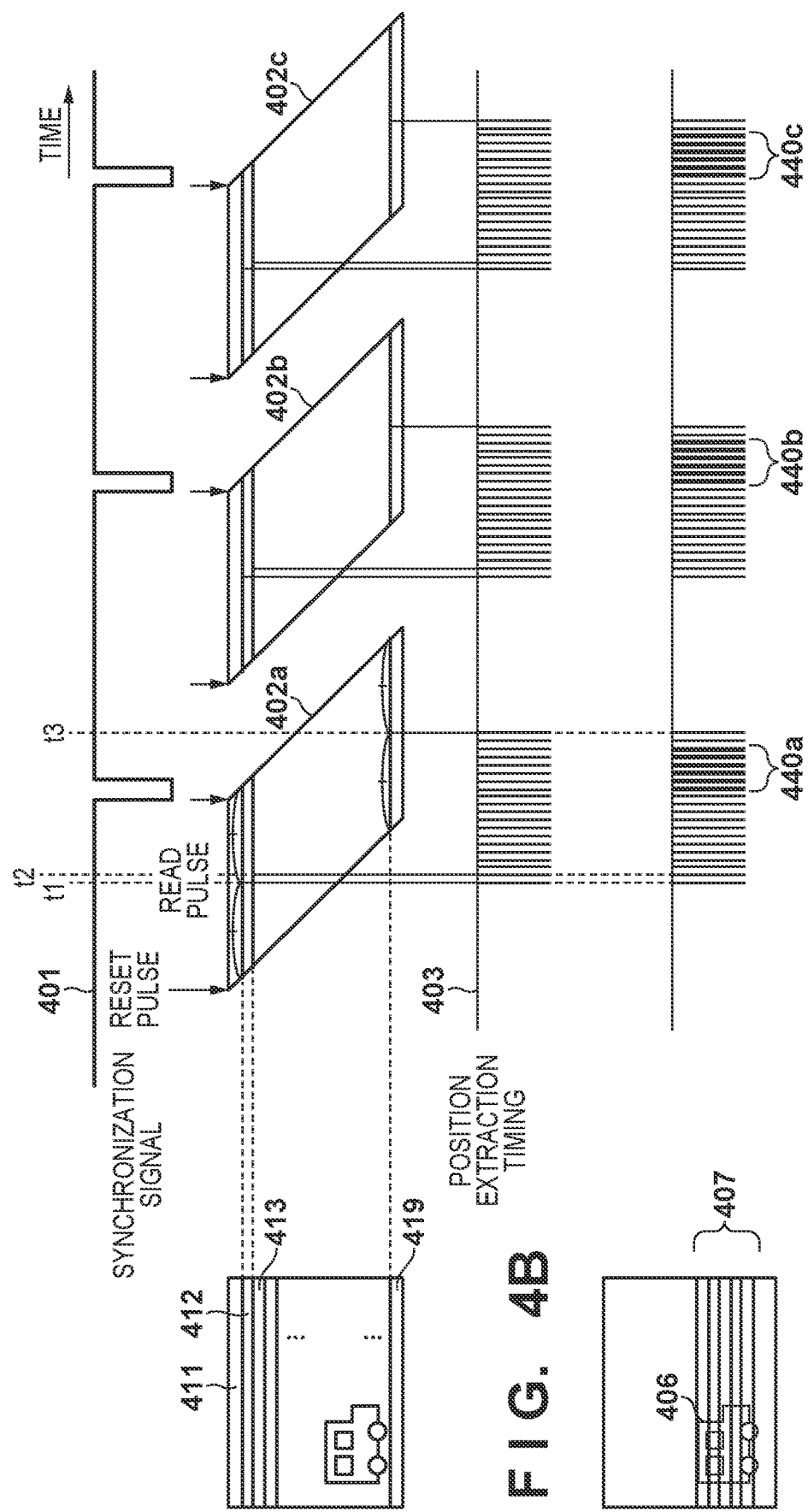
FIGS. 4A and 4B are diagrams illustrating the timing at which position information of an image stabilization mechanism is extracted, according to the first embodiment.

The timing of the extraction by the stabilization position extracting unit 204 in a case where the present embodiment is employed will be described next with reference to FIGS. 4A and 4B. In FIG. 4A, a signal 401 is a synchronization signal, and the period thereof corresponds to the framerate. Exposure periods 402a, 402b, and 402c, which correspond to first, second, and third frames, respectively, correspond to exposure periods for the frames. The present embodiment assumes that a CMOS sensor is used as the image sensor 150, and exposure periods are indicated for each period corresponding to the framerate. If the CMOS sensor is driven through a rolling shutter, the readout timing is different for each horizontal readout line of the image sensor 150. In FIG. 4A, the readout is carried out in order from a horizontal readout line 411 at the top, to a horizontal readout line 412, a horizontal readout line 413, and so on up to a horizontal readout line 419. Thus as can be seen from the exposure period 402a too, the exposure timing shifts from the horizontal readout line 411 at the top to the horizontal readout line 419 at the bottom.

A signal 403 is the output from the timing notifying unit 201, and indicates the timing at which the stabilization position extracting unit 204 extracts the position information from the camera stabilization position sensor 131.

In the present embodiment illustrated in FIG. 4A, the extraction timing is set to a central time, which corresponds to the center of the exposure period in each horizontal readout line of the image sensor 150. For example, the central time of the exposure period for the horizontal readout line 411 at the top is a time t1. At that time t1, the timing notifying unit 201 notifies the stabilization position extracting unit 204 that it is the timing for extracting the position information, and the stabilization position extracting unit 204 extracts the position information. Likewise, the stabilization position extracting unit 204 extracts the position information in order, at a time t2 for the horizontal readout line 412, at a time t3 for the horizontal readout line 419, and so on. The same applies to the exposure periods 402b and 402c, which are the second and third exposure periods, respectively.

As a result, the output of the camera stabilization position sensor 131, corresponding to each horizontal readout line, is extracted. An accurate amount of correction for the image stabilization mechanism can be found for each horizontal readout line on the basis of the extracted position information from the camera stabilization position sensor 131 and the focal length of the optical system at that point in time. Furthermore, because the amount of correction is found for each horizontal readout line, the amount of correction can also be calculated according to the subject, if the region of the subject is found as well.

For example, assuming a subject 406 is present as illustrated in FIG. 4B, a plurality of horizontal readout lines corresponding to the position of the subject 406 correspond to subject lines 407. The amount of correction for the image stabilization mechanism in each frame corresponding to those subject lines 407 matches that obtained at extraction timings 440a to 440c.

Note that the position information of the subject found by the subject position detection unit 161 may be transmitted to the stabilization position extracting unit 204, and the position information from the camera stabilization position sensor 131, corresponding to the subject lines 407, may be extracted by the stabilization position extracting unit 204, and then transmitted to the subject movement amount detection unit 163.

Although the present embodiment describes a method of determining the extraction timing for each horizontal readout line in the image sensor 150, the extraction may occur for the horizontal readout line every set interval instead.

According to the first embodiment as described thus far, an accurate amount of correction for the image stabilization mechanism can be obtained, which makes it possible to find a more accurate subject movement amount.

Second Embodiment

A second embodiment of the present invention will be described next with reference to FIGS. 5 to 7.

Figure 5:
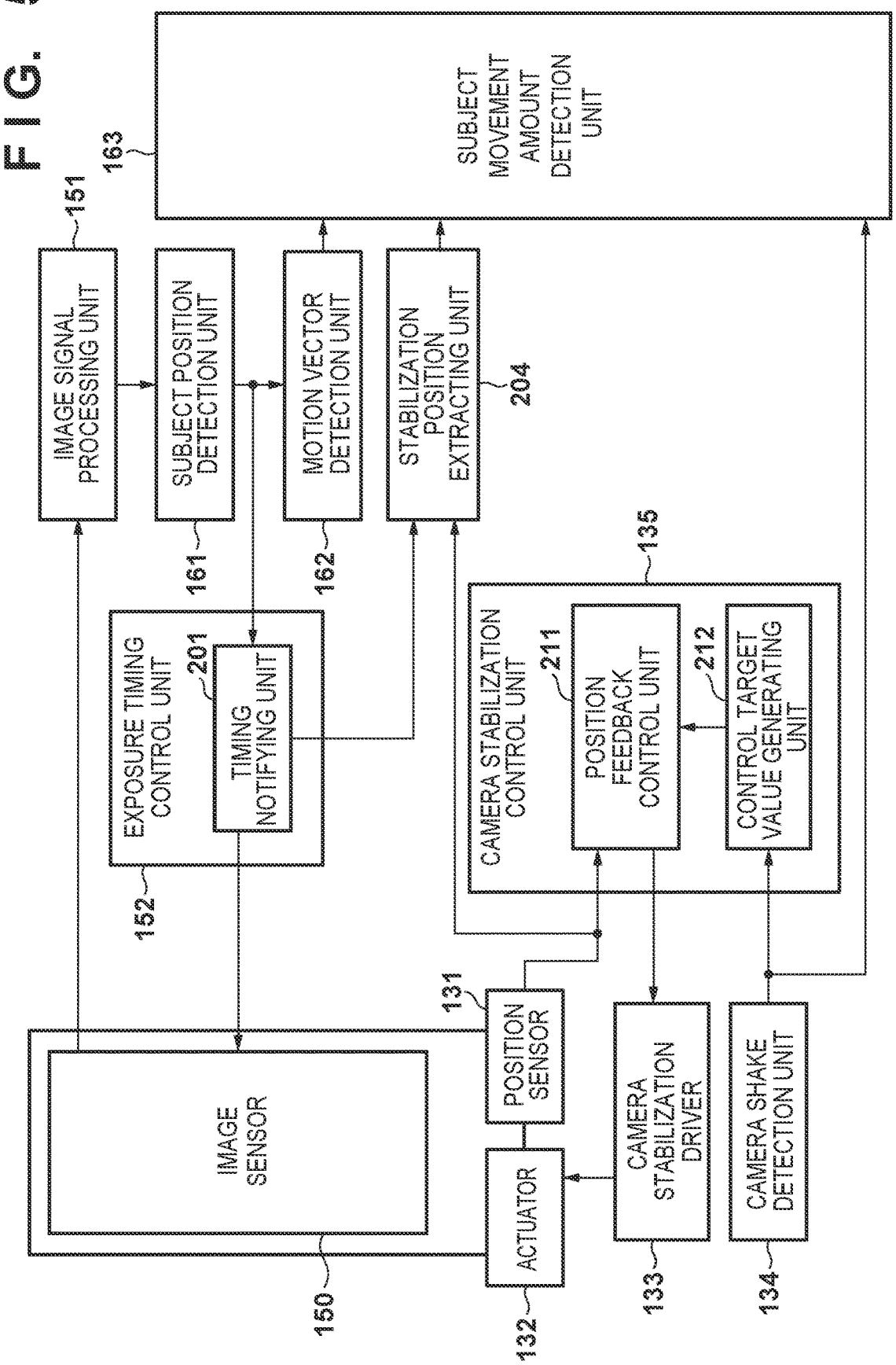
FIG. 5 is a block diagram illustrating, in detail, a configuration involved in a subject movement detection process according to a second embodiment.

FIG. 5 is a block diagram illustrating, in further detail, a configuration used for a subject movement detection process according to the second embodiment of the present invention. Note that elements that are the same as those illustrated in FIG. 3 are given the same reference numerals, and will not be described. The configuration illustrated in FIG. 5 differs from the configuration illustrated in FIG. 3 in that the various types of subject information detected by the subject position detection unit 161 are output to the timing notifying unit 201.

The timing of the extraction carried out by the stabilization position extracting unit 204 according to the second embodiment will be described next with reference to FIG. 6. As in FIGS. 4A and 4B, the signal 401 is a synchronization signal synchronized with the frames. A signal 603 is a signal, output from the timing notifying unit 201, which indicates the timing at which the position information from the camera stabilization position sensor 131 is extracted. Exposure periods 602a to 602c correspond to the exposure periods of individual frames.

Figure 6:
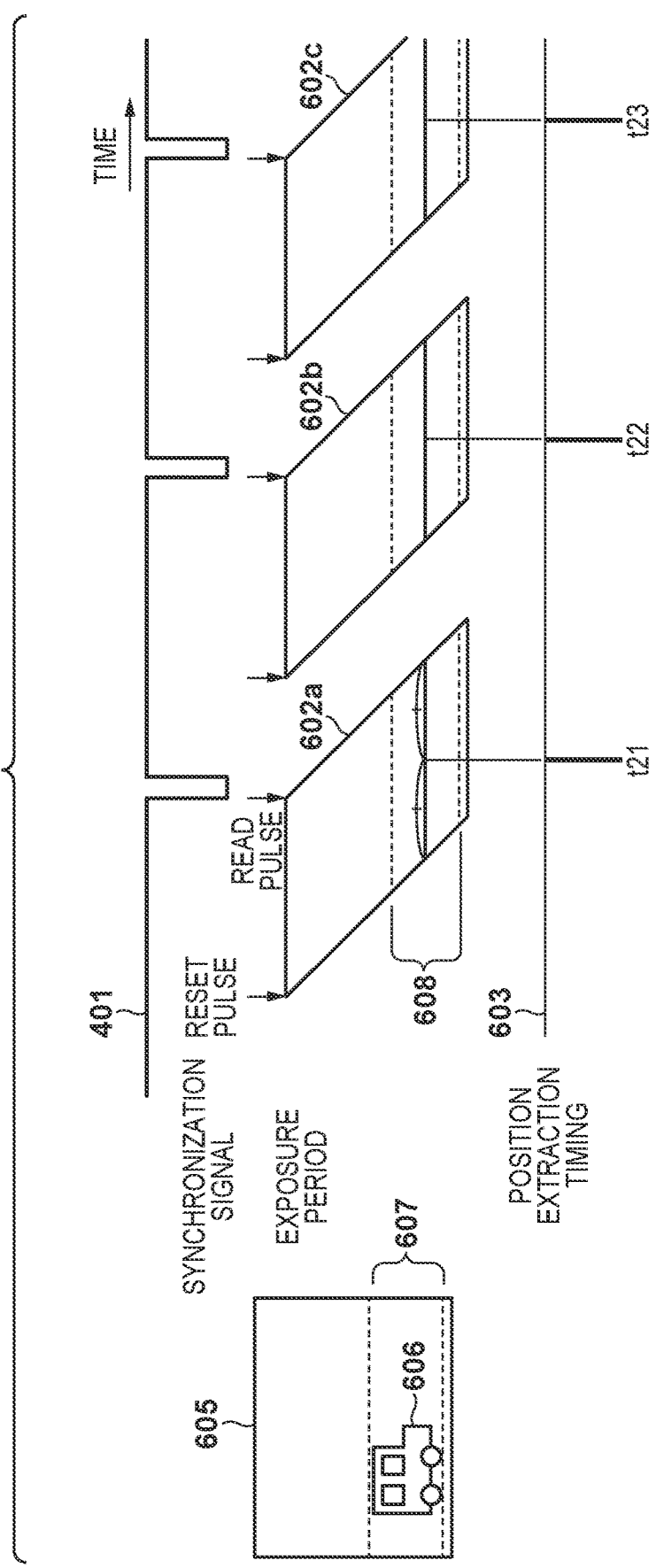
FIG. 6 is a diagram illustrating the timing at which position information of an image stabilization mechanism is extracted, according to the second embodiment.

As illustrated in FIG. 6, the second embodiment assumes that a subject 606 is present in a shot image 605, and that the position of the subject 606 at that time is detected by the subject position detection unit 161. If the position of the subject 606 has been found, subject lines 607, which are the range of horizontal readout lines in the image sensor 150 corresponding to the position of the subject 606, can be found as well. Furthermore, the exposure periods corresponding to the subject lines 607 can be found on the basis of the shooting conditions and the like, as subject exposure periods 608. A time t21 that is the center of the exposure time of a line at the center of the subject lines 607 is the central time of the subject exposure period 608. Accordingly, extracting the position information from the camera stabilization position sensor 131 at time t21 makes it possible to calculate a stabilization correction amount corresponding to the subject 606. In the same manner, the position information from the camera stabilization position sensor 131 is extracted at times t22 and t23 for the exposure periods 602b and 602c, which are the second and third exposure periods, respectively.

Figure 7:
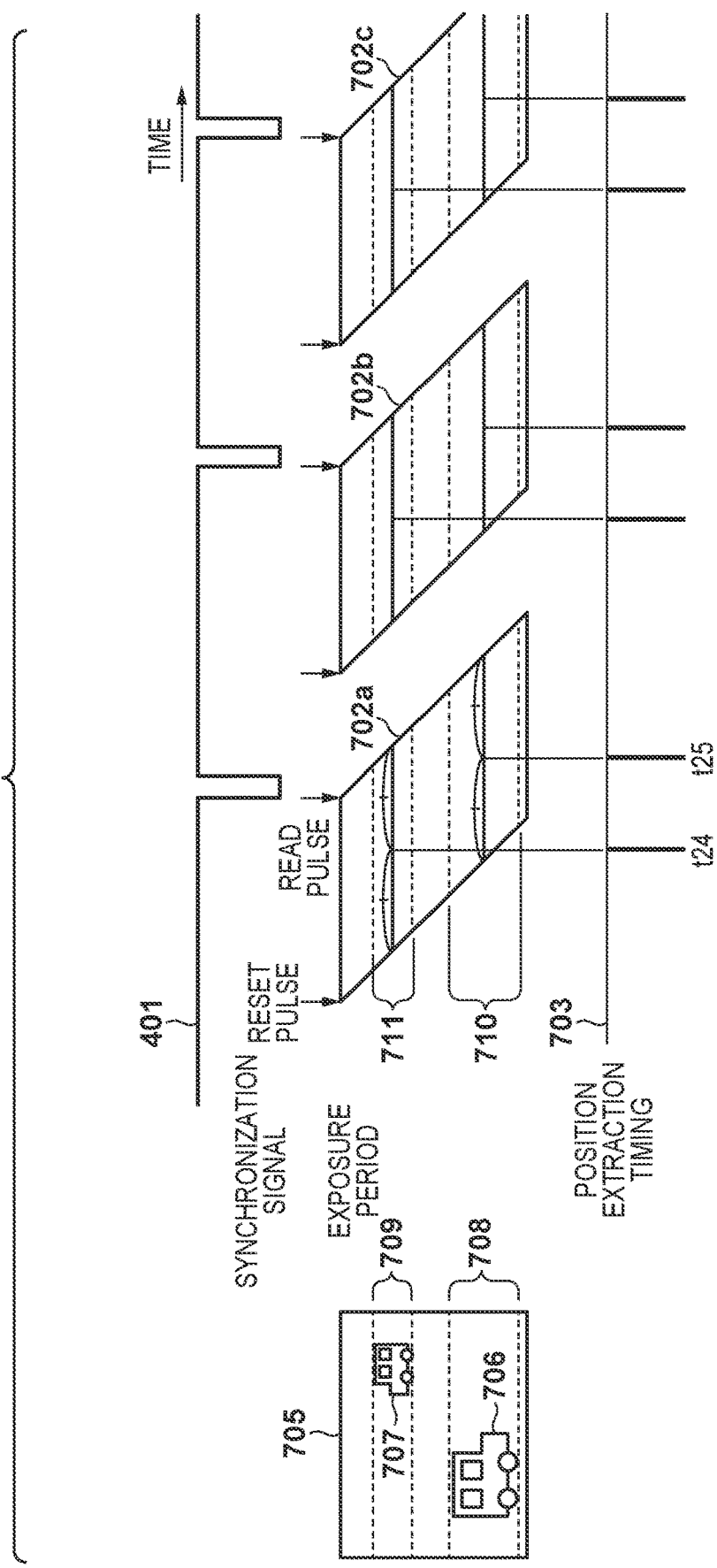
FIG. 7 is a diagram illustrating the timing at which position information of the image stabilization mechanism is extracted, in a case where there are a plurality of subjects, according to the second embodiment.

FIG. 7 illustrates the timing of extraction when there are two subjects, namely subjects 706 and 707, in a shot image 705. In this case as well, using the same concept as that described with reference to FIG. 6, the position information from the camera stabilization position sensor 131 is extracted at a central time t25 of subject exposure periods 710 of subject lines 708, which are the range of horizontal readout lines in the image sensor 150 corresponding to the subject 706. Similarly, the position information from the camera stabilization position sensor 131 is extracted at a central time t24 of subject exposure periods 711 of subject lines 709, which are the range of horizontal readout lines corresponding to the subject 707. The same applies to the exposure periods 602b and 602c, which are the second and third exposure periods, respectively.

As described earlier, the information extraction timing is determined in accordance with the position of the subject in the shot image, in addition to the shooting conditions. Accordingly, as illustrated in FIG. 5, the position information of the subject, as found by the subject position detection unit 161, is required by the timing notifying unit 201 to determine the timing.

According to the second embodiment as described thus far, an accurate amount of correction for the image stabilization mechanism can be obtained, which makes it possible to find a more accurate subject movement amount.

Third Embodiment

A third embodiment of the present invention will be described next with reference to FIGS. 8 to 10.

Figure 8:
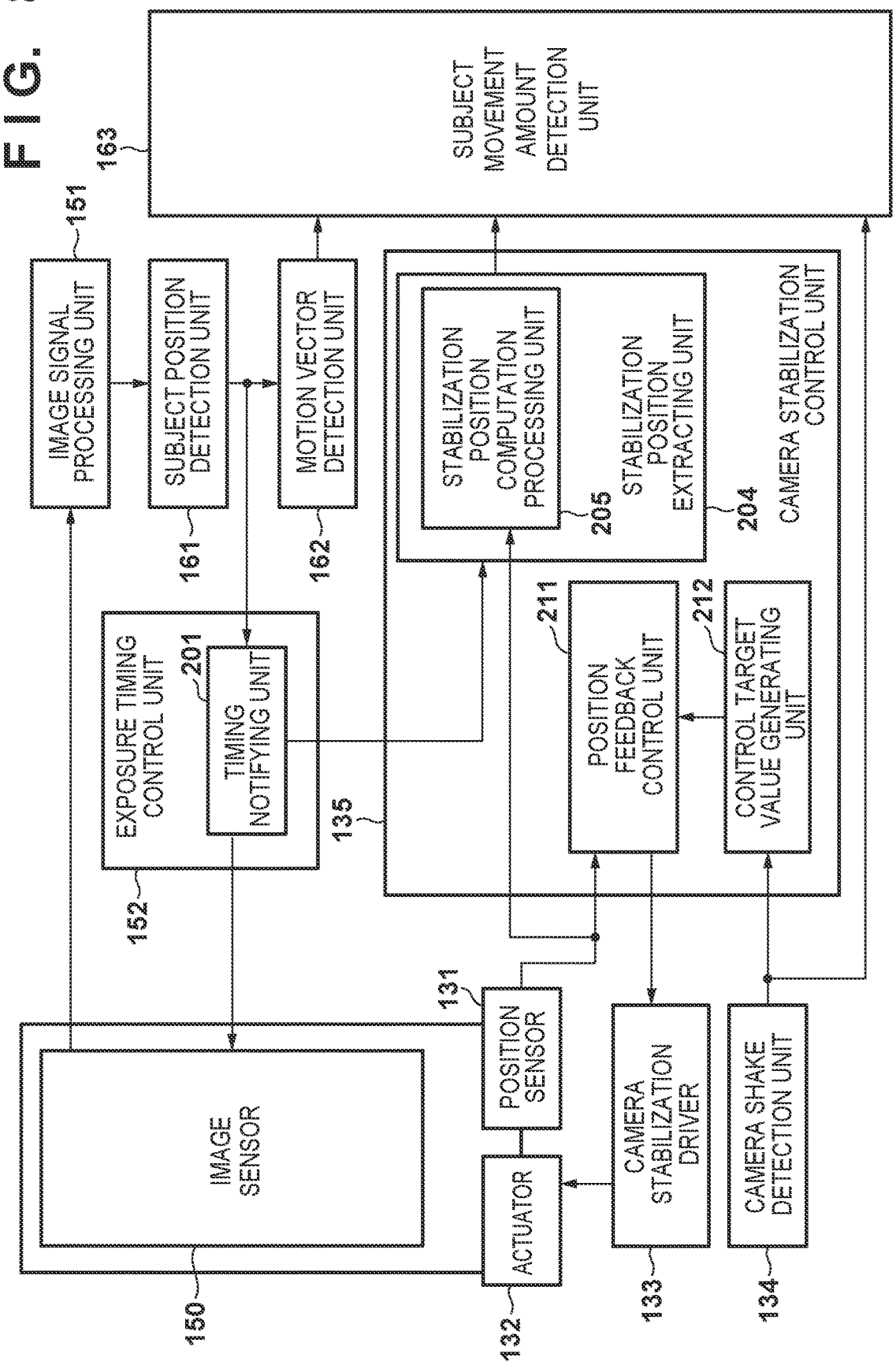
FIG. 8 is a block diagram illustrating, in detail, a configuration involved in a subject movement detection process according to a third embodiment.

FIG. 8 is a block diagram illustrating, in further detail, a configuration used for a subject movement detection process according to the third embodiment of the present invention. Note that elements that are the same as those illustrated in FIGS. 3 and 5 are given the same reference numerals, and will not be described. The configuration illustrated in FIG. 8 differs from the configuration illustrated in FIG. 5 in that in FIG. 8, the camera stabilization control unit 135 includes the stabilization position extracting unit 204, and that the stabilization position extracting unit 204 further includes a stabilization position computation processing unit 205.

The timing of the extraction carried out by the stabilization position extracting unit 204 according to the third embodiment will be described next with reference to FIG. 9. FIG. 9 illustrates signal timings according to the third embodiment. As in FIG. 6, the signal 401 is a synchronization signal synchronized with the frames. A signal 903 is a signal, output from the timing notifying unit 201, which indicates the timing at which the position information from the camera stabilization position sensor 131 is extracted. Exposure periods 602a to 602c correspond to the exposure periods of individual frames.

Figure 9:
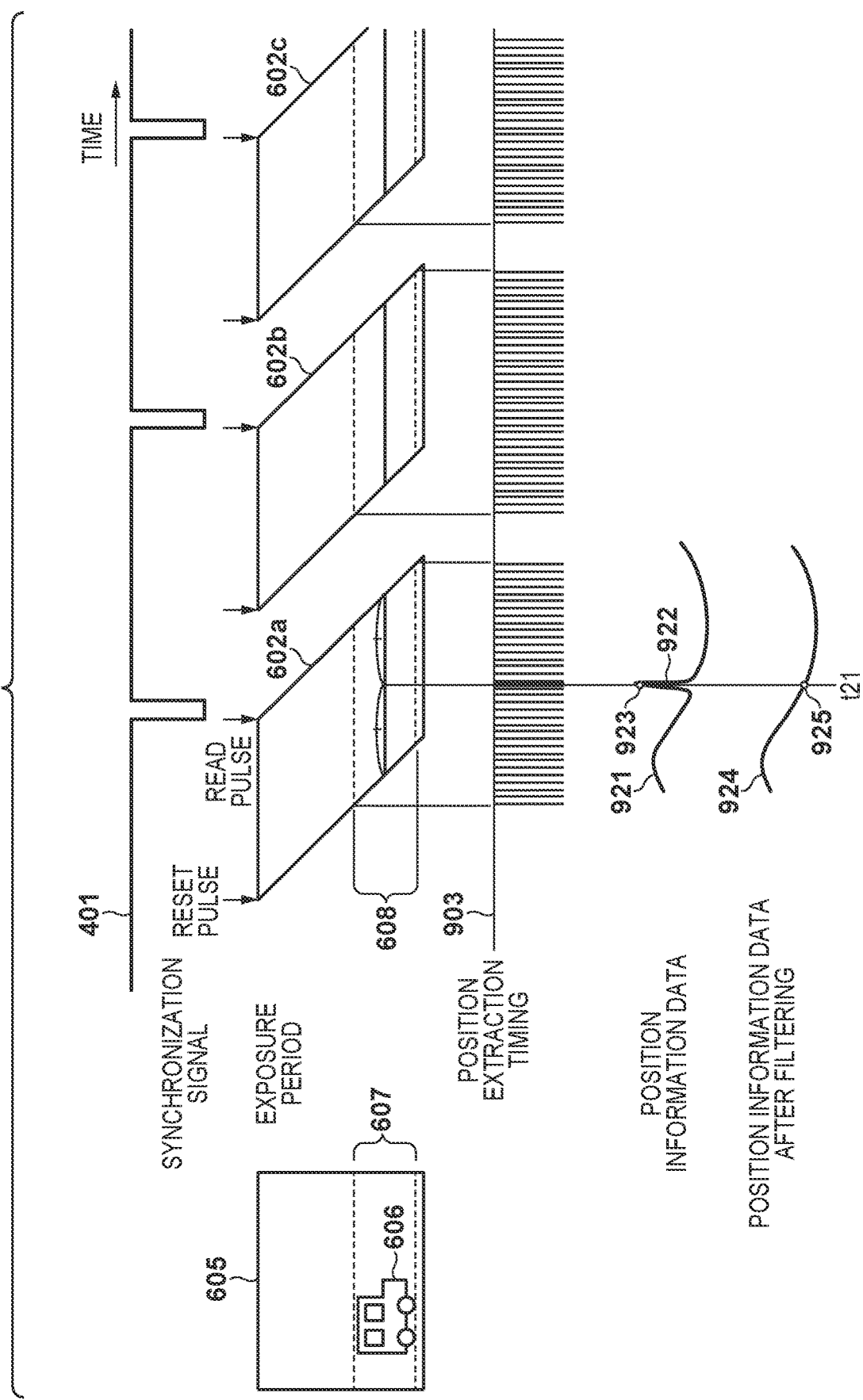
FIG. 9 is a diagram illustrating the timing at which position information of an image stabilization mechanism is extracted, according to the third embodiment.
Figure 10:
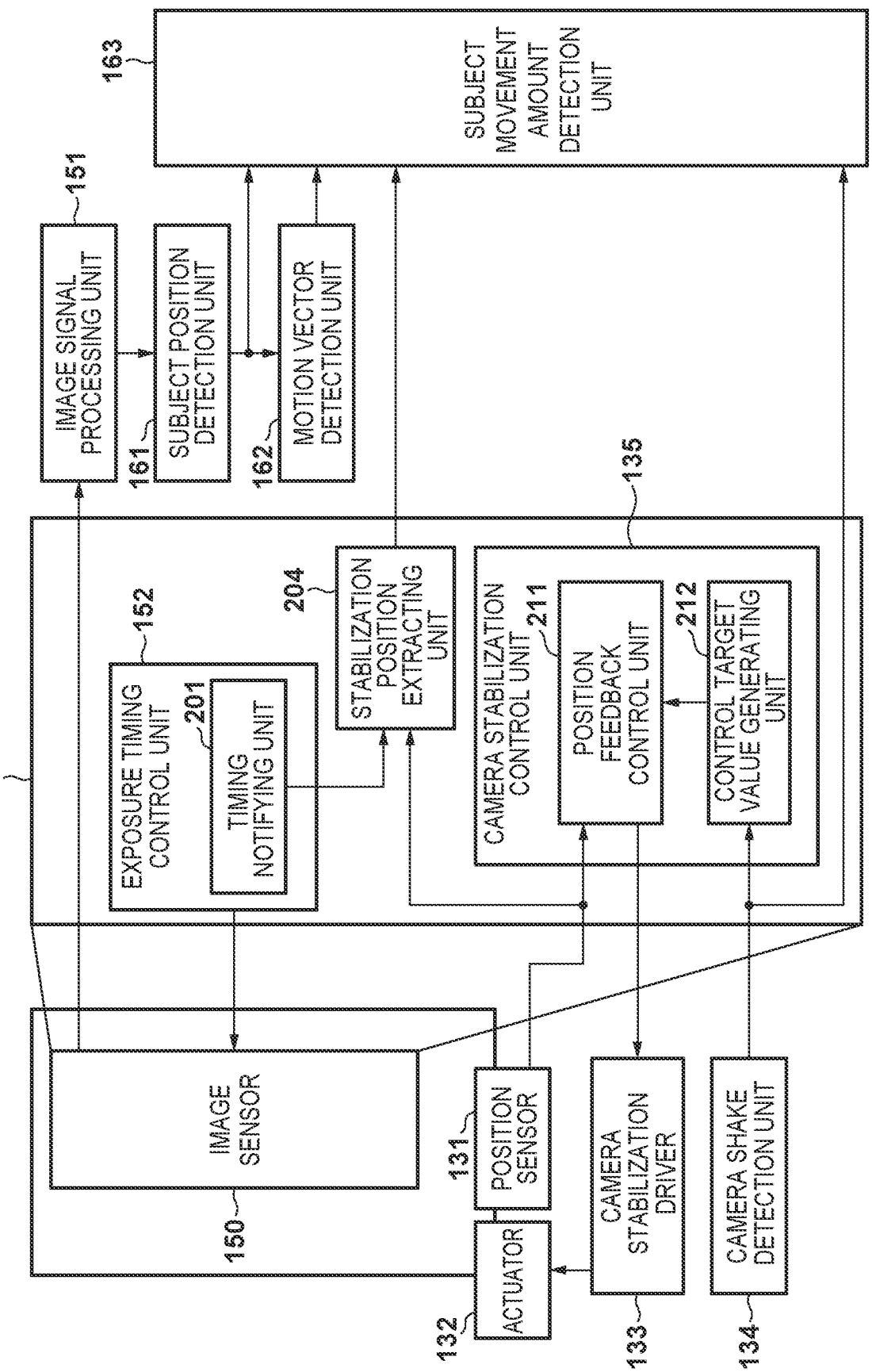
FIG. 10 is a block diagram illustrating another configuration involved in the subject movement detection process, according to the third embodiment.

As illustrated in FIG. 9, the third embodiment also assumes that the subject 606 is present in the shot image 605, and that the position of the subject 606 at that time is detected by the subject position detection unit 161. The subject exposure periods 608 are the exposure periods corresponding to the subject lines 607 which are the horizontal readout lines where the subject 606 is located. The time t21 that is the center of the exposure time of a line at the center of the subject lines 607 is the central time of the subject exposure period 608.

In FIG. 9, a signal 921 indicates the position information output from the camera stabilization position sensor 131 in time series according to the third embodiment, and a signal 924 is obtained by filtering that time series data.

In the third embodiment, the position information from the camera stabilization position sensor 131 is obtained at a set cycle during the subject exposure period 608, and that time series data is subjected to a filtering computation process for removing noise, such as low-pass filter (LPF) processing. The information at time t21 is extracted from the position information that has undergone the LPF processing. By doing so, even if there is noise in the position information at the time of extraction, that noise can be removed.

For example, if the camera body 120 has been subjected to a temporary impact at time t21, that impact will propagate to the image sensor 150 as well, and will be observed as noise in the output of the camera stabilization position sensor 131 as a result. The noise resulting from that impact is represented by a pulse 922. If the timing of that pulse 922 coincides with the extraction time t21, position data 923 will be extracted as the position information from the camera stabilization position sensor 131, corresponding to the subject 606.

However, the position feedback control unit 211 is carrying out feedback control, and thus even if the position is shifted for an instant by the impact, the image sensor 150 immediately returns to the desired position. As such, the positional shift of the image sensor 150 caused by the impact occurs only for an instant with respect to the subject exposure period 608, and therefore produces almost no effect on the exposed image 905. The required information in the present invention is the stabilization correction amount for an exposed shot image, and thus the information to be extracted at the extraction timing t21 is not the position data 923 of the position information at the time of the impact, but rather the position information of the exposure periods before and after the impact. Carrying out the LPF processing described earlier, as in the present embodiment, makes it possible to obtain the desired position information.

Accordingly, in the present embodiment, the stabilization position computation processing unit 205 is provided in the stabilization position extracting unit 204, as illustrated in FIG. 8. The position information is then extracted after using the stabilization position computation processing unit 205 to carry out filtering processing, such as LPF processing, to remove noise. Although an LPF is used for noise removal in the third embodiment, a smoothing process may instead be carried out through another type of computation, such as an averaging process.

According to the third embodiment as described thus far, an accurate amount of correction for the image stabilization mechanism can be obtained even when the camera body 120 has been subjected to a temporary impact, which makes it possible to find a more accurate subject movement amount.

The foregoing describes an example of a configuration in which the image sensor 150, the camera stabilization control unit 135, the exposure timing control unit 152, and the stabilization position extracting unit 204 are separate units. However, a processing block 210 constituted by a logic circuit that integrates the camera stabilization control unit 135, the exposure timing control unit 152, and the stabilization position extracting unit 204 may be configured, and that processing block 210 may be integrated with the image sensor 150, as illustrated in FIG. 10. Doing so makes it easy to link the signals among the blocks to each other, which in turn makes it possible to realize faster and more accurate signal processing.

Fourth Embodiment

A fourth embodiment of the present invention will be described next with reference to FIGS. 11 to 13C.

Figure 11:
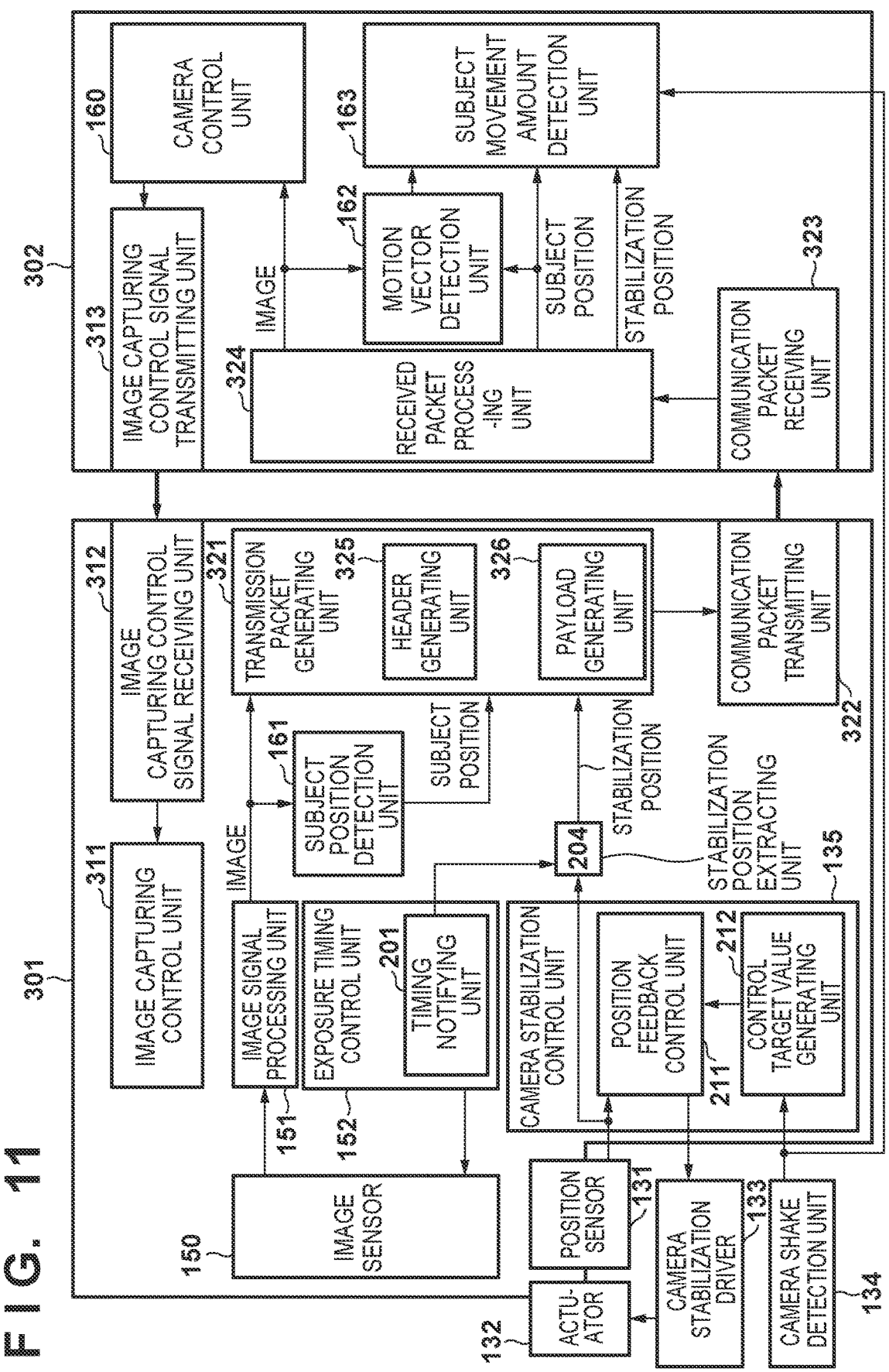
FIG. 11 is a block diagram illustrating, in detail, a configuration involved in a subject movement detection process according to a fourth embodiment.

FIG. 11 is a block diagram illustrating, in detail, a configuration used for a subject movement detection process according to the fourth embodiment of the present invention. The configuration illustrated in FIG. 11 corresponds to the configuration illustrated in FIG. 3, but divided between two circuit boards. Accordingly, a configuration and a control unit for communication between the two circuit boards has been added. Note that elements that are the same as those illustrated in FIG. 3, 5, or 8 are given the same reference numerals, and will not be described.

In FIG. 11, an image stabilization circuit 301 is a circuit block including the image sensor 150, the camera stabilization control unit 135, and the like, and is formed on a single semiconductor device, circuit board, or the like. A camera control circuit 302 is a circuit block including a camera control unit 160, the motion vector detection unit 162, the subject movement amount detection unit 163, and the like, and is formed on a different circuit board or semiconductor device from the image stabilization circuit 301.

An image capturing control unit 311 is configured in the image stabilization circuit 301, and receives control information pertaining to image capturing from the camera control unit 160, via an image capturing control signal receiving unit 312 configured in the image stabilization circuit 301 and an image capturing control signal transmitting unit 313 configured in the camera control circuit 302. Shooting conditions such as the exposure period, a pixel readout algorithm for the image sensor 150, and so on are set using the received control information, to control the image sensor 150, the exposure timing control unit 152, and the like, as well as to control the image signal processing unit 151 and the like.

The stabilization position extracting unit 204 extracts the output of the camera stabilization position sensor 131 at the timings described above with reference to FIGS. 4A and 4B, FIG. 6, or FIG. 7, in response to a signal from the timing notifying unit 201.

A communication packet transmitting unit 322 configured in the image stabilization circuit 301 and a communication packet receiving unit 323 configured in the camera control circuit 302 are communication blocks that pass data from the image stabilization circuit 301 to the camera control circuit 302. At this time, packet data generated by a transmission packet generating unit 321, transmitted from the communication packet transmitting unit 322, is analyzed by a received packet processing unit 324, and is then passed to the respective processing blocks of the camera control circuit 302 as data. The transmission packet generating unit 321 includes a header generating unit 325 that generates a header to be added to the packet data, and a payload generating unit 326 that generates the payload of the packet data. This header and payload include pixel data for each horizontal line, position information of the image stabilization mechanism, the shooting conditions, the subject position, and so on, as well as other information for identification, which will be described in detail later.

The subject movement amount detection unit 163 detects the movement amount of the subject on the basis of the outputs of the motion vector detection unit 162 and the camera shake detection unit 134, and the pixel data, position information of the image stabilization mechanism, subject position, and the like extracted from the packet data that has been analyzed by the received packet processing unit 324.

Figure 12:
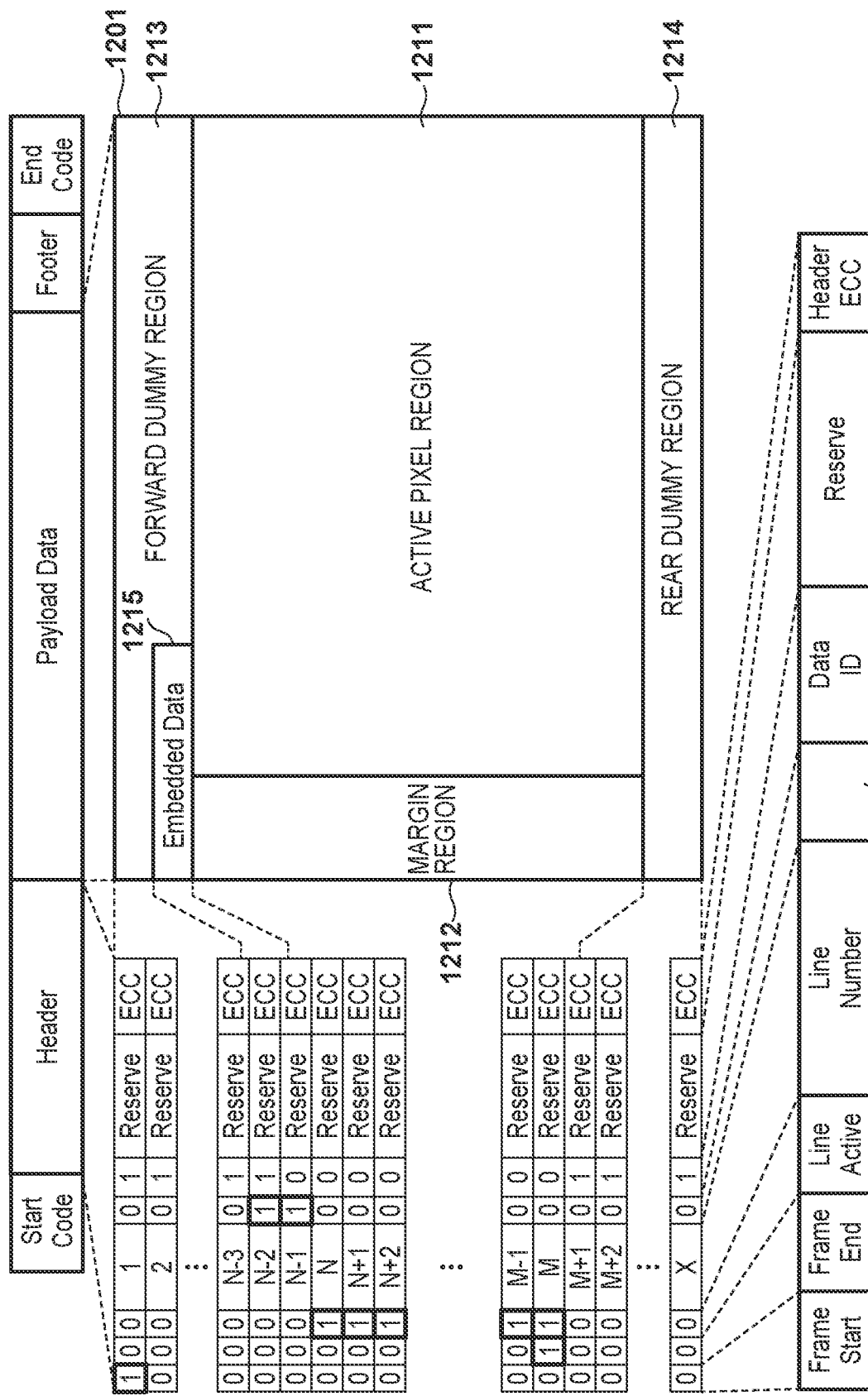
FIG. 12 is a diagram illustrating an example of the configuration of a transmission packet according to the fourth embodiment.

FIG. 12 is a diagram illustrating an example of the format of the packets generated by the transmission packet generating unit 321 and used to transmit a single frame's worth of image data. A pixel data region 1201 illustrated in FIG. 12 indicates the region of the pixel data to be transmitted, and an active pixel region 1211 is a region of active pixels in a single frame of an image captured by the image sensor 150. A margin region 1212, which has the same number of pixels in the vertical direction as the number of pixels in the vertical direction in the active pixel region 1211, is set on the left side of the active pixel region 1211. A forward dummy region 1213, which has the same number of pixels in the horizontal direction as the overall number of pixels in the active pixel region 1211 and the margin region 1212 in the horizontal direction, is set above the active pixel region 1211. In FIG. 12, embedded data 1215 is inserted into the forward dummy region 1213. The embedded data 1215 includes information such as setting values pertaining to the image capturing by the image sensor 150, including the shutter speed, gain, and the like, as well as the subject position and so on. A rear dummy region 1214, which has the same number of pixels in the horizontal direction as the overall number of pixels in the active pixel region 1211 and the margin region 1212 in the horizontal direction, is set below the active pixel region 1211. Note that the embedded data 1215 may also be inserted into the rear dummy region 1214. The pixel data region 1201 is constituted by the active pixel region 1211, the margin region 1212, the forward dummy region 1213, and the rear dummy region 1214.

The band on the upper side in FIG. 12 indicates the structure of the packet data used in the transmission according to the present embodiment. When a string of pixels in the horizontal direction is taken as a line, the pixel data of each line constituting the pixel data region 1201 is held in the payload of the packet. A single packet is constituted by adding a header and footer, as well as control codes such as a start code before the header and an end code after the footer, to a payload holding one line's worth of pixel data. Note that the footer is added as an option, and a control code such as an end code is added after the payload if a footer is not added.

As will be described later, the header includes additional information for the pixel data held in the payload, such as Frame Start, Frame End, Line Valid, Line Number, ECC, and the like. By employing a format that transmits the pixel data constituting a single frame of an image on a line-by-line basis in this manner, additional information such as the header, control codes such as the start code and the end code, and so on can be transferred during the blanking period for each line.

The entirety of one frame's worth of image data is transferred using a number of packets greater than or equal to the number of pixels in the pixel data region 1201 in the vertical direction.

The bands on the left side and the bottom of FIG. 12 indicate the content of the header information. FIG. 13A is a diagram collectively illustrating the format of the packets indicated at the top of FIG. 12, details of the header information indicated at the bottom of FIG. 12, and Reserve content. FIG. 13B illustrates an example of the content of the header information and the amount of that information.

Frame Start is 1-bit information indicating the start of the frame. A value of 1 is set for the Frame Start of the header of the packet used to transfer the first line of pixel data in the pixel data region 1201 illustrated in FIG. 12, whereas a value of 0 is set for the Frame Start of the headers of the packets used to transfer the pixel data of the other lines. Frame End is 1-bit information indicating the end of the frame. A value of 1 is set for the Frame End of the header of the packet including the pixel data of the final line in the active pixel region 1211 in its payload, whereas a value of 0 is set for the Frame End of the headers of the packets used to transfer the pixel data of the other lines. The Frame Start and Frame End serve as "frame information", which is information pertaining to the frame.

Line Active is 1-bit information indicating whether or not a line in the pixel data held in the payload is a line of active pixels. A value of 1 is set for the Line Active of the header of the packet used to transfer the pixel data of the line within the active pixel region 1211, whereas a value of 0 is set for the Line Active of the headers of the packets used to transfer the pixel data of the other lines. Line Number is 13-bit information expressing a line number of a line constituted by the pixel data held in the payload. Embedded Line is 1-bit information indicating whether or not the packet is a packet used to transfer a line in which embedded data is inserted. For example, a value of 1 is set for the Embedded Line of the header of a packet used to transfer a line including embedded data, whereas a value of 0 is set for the Embedded Line of the headers of packets used to transfer other lines. As described earlier, the embedded data is inserted into a predetermined line in the forward dummy region 1213 and the rear dummy region 1214. The Line Active, Line Number, and Embedded Line serve as "line information", which is information pertaining to the lines.

A Data ID is information for identifying the data held in the payload, whereas Reserve is a region used for extension. A method for using the Data ID and the Reserve in the present embodiment will be described later. Note that 0 being set for the Data ID in FIG. 12 is assumed to indicate that the data held in the payload is pixel data. Header ECC is information including an error detection code calculated on the basis of the header information.

In the fourth embodiment, the position information of the image stabilization mechanism is added to the Reserve region. As illustrated in FIG. 13A, the position information of the image stabilization mechanism is held in a position information region 1301 in a Reserve extension region, as 24-bit information. Accordingly, of the 29 bits available in the Reserve region, 24 bits are used for the position information region 1301, and the remaining 5 bits are used as the Reserve region. FIG. 13C illustrates the overall transmission packet of a single frame at that time. It can be seen that in the packet of an active pixel line in the Nth line, position information 1302 when the Nth line was exposed is added to the Reserve region, pixel data 1303 is added to the payload data, and the packet is sent in that state.

Configuring the transmission packet in this manner makes it possible to send the pixel data and position information in the same horizontal line in the same transmission packet, which makes it easy to handle the pixel data and position information in synchronization with each other.

Although the foregoing describes an example in which the configuration illustrated in FIG. 3 is divided between two circuit boards, the configurations illustrated in FIGS. 5 and 8 can also be divided between two circuit boards as well. In such a case, the control described with reference to FIGS. 6 and 7, and FIG. 9, respectively, can be carried out.

Fifth Embodiment

Figure 14A:
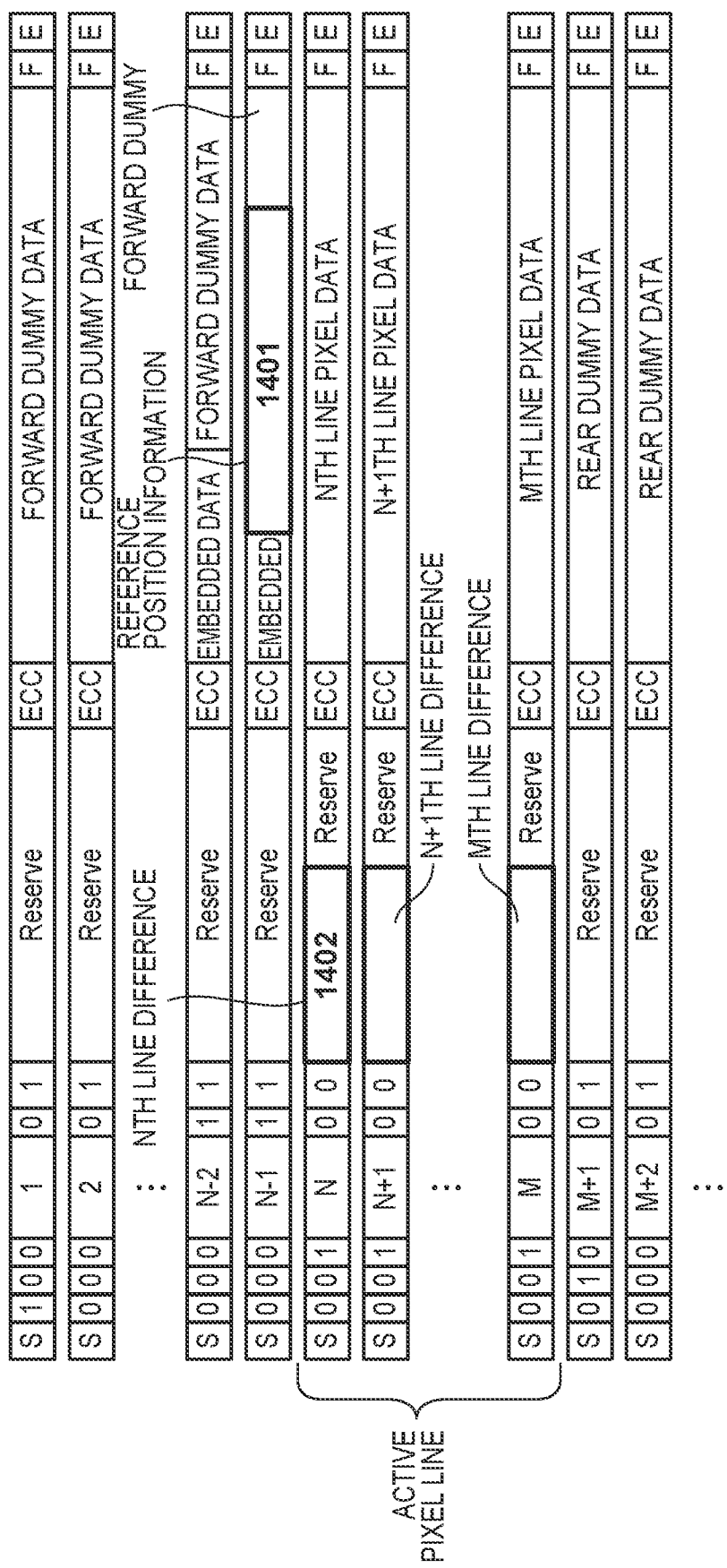
FIG. 14A is a diagram illustrating an example of the configuration of a transmission packet according to a fifth embodiment.
Figure 14B:
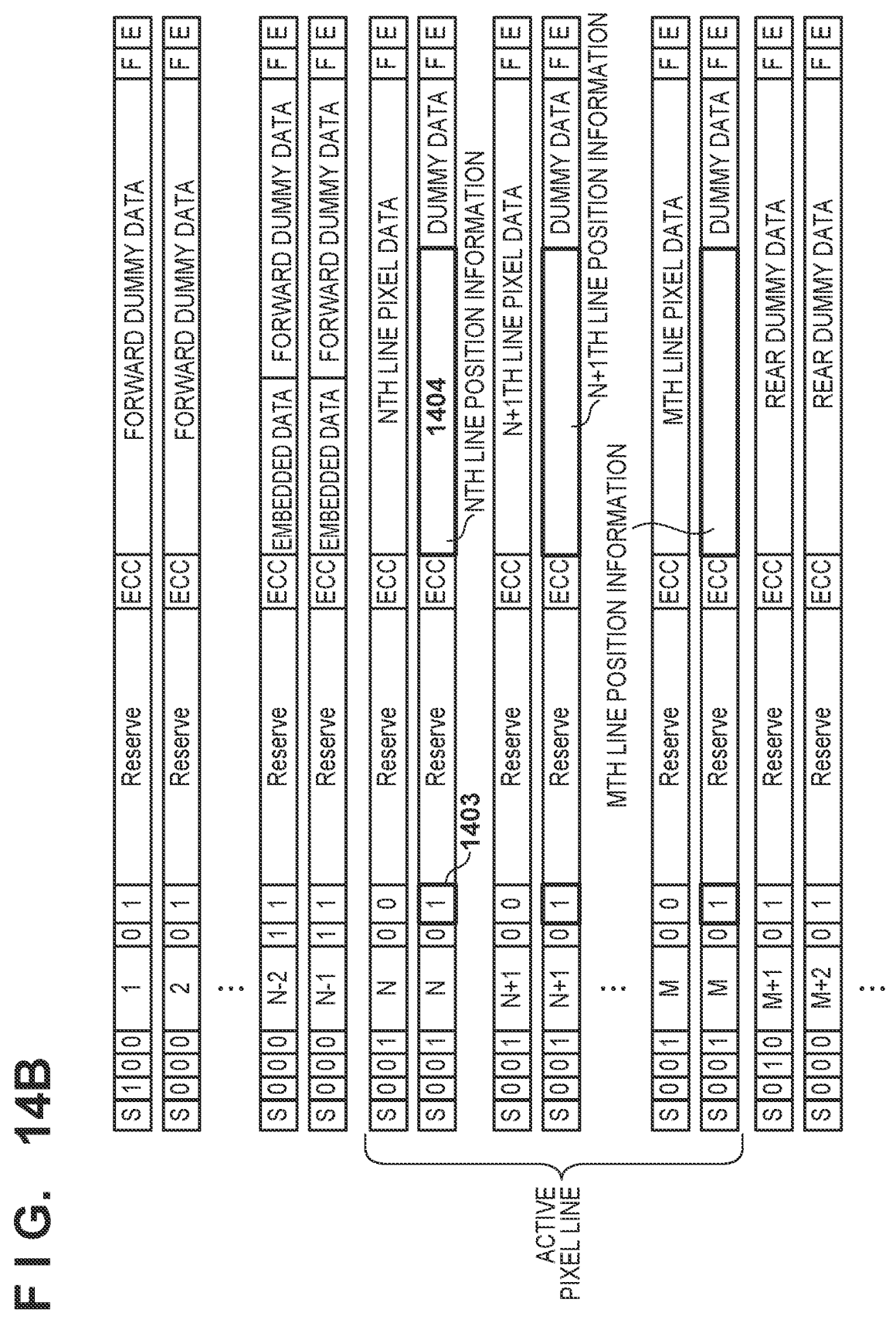
Figure 14C:
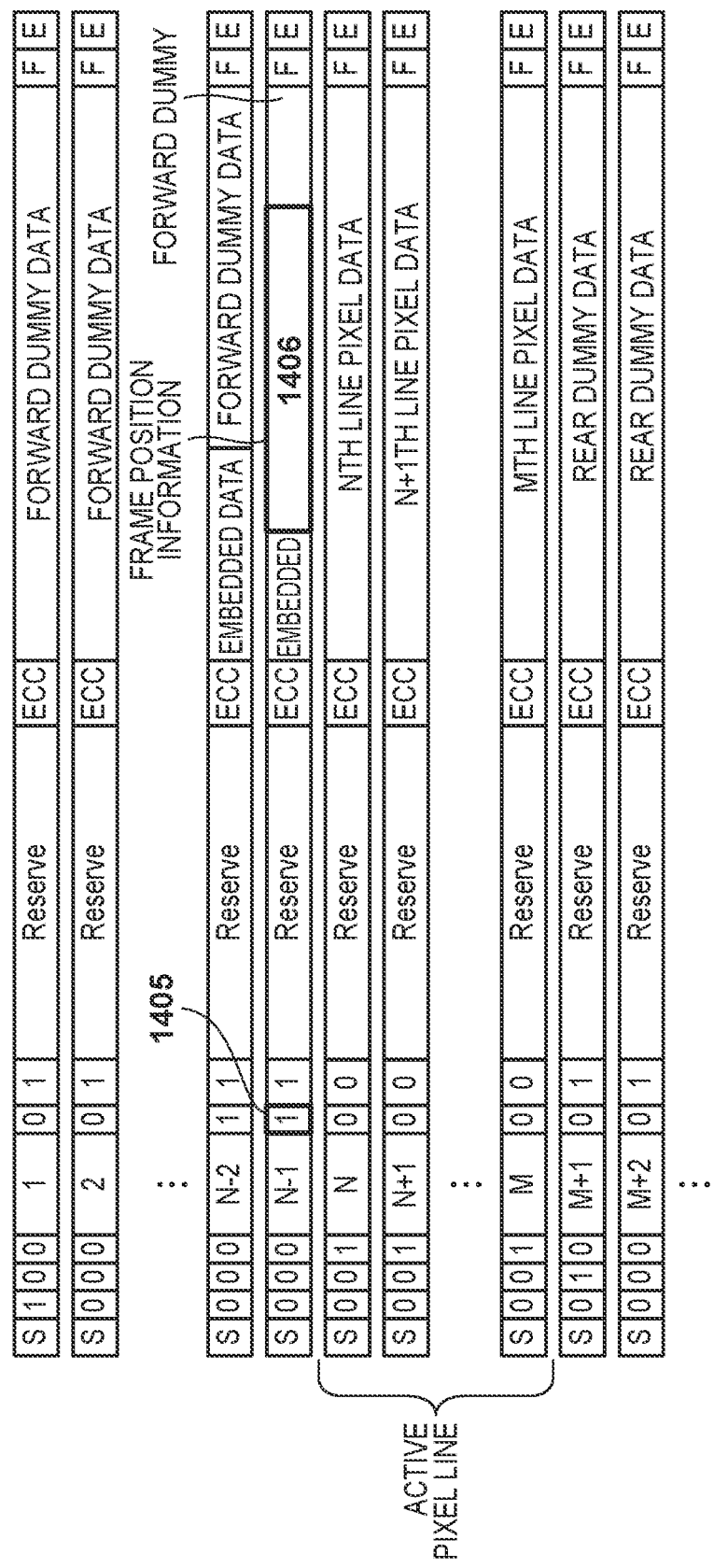
FIG. 14C is a diagram illustrating an example of the configuration of a transmission packet according to the fifth embodiment.

A fifth embodiment of the present invention will be described next with reference to FIGS. 14A to 14C. With reference to FIGS. 14A to 14C, position information transmission methods that uses different formats will be explained. Note that the fifth embodiment is assumed to employ the configuration illustrated in FIG. 11, which will therefore not be described here.

According to the format illustrated in FIG. 14A, the position information is divided into "reference information" and "differential information" and transmitted. The position information, which serves as a reference for the frame (reference position information), is added as embedded data, and in the packet for each horizontal line, a differential value from the reference position information (differential position information) is added to the Reserve region. In FIG. 14A, the embedded data is inserted into the forward dummy region 1213, and reference position information 1401, which serves as a reference for that frame, is held in part of that data. Differential position information 1402 is held in the Reserve region as the difference between the position information at that time and the reference position information 1401, in the packet for the Nth line of the active pixel region 1211. Doing so makes it possible to reduce the data size of the differential position information 1402 held in the Reserve region of each packet.

The format illustrated in FIG. 14B assumes that the position information is added to the payload data that up until this point has held the pixel data and the embedded data. To realize this, a Data ID 1403, included in the header information as described earlier, is used. The Data ID 1403 is header information for identifying the data held in the payload. In FIG. 14B, a Data ID of 0 is set in a case where the data held in the payload is pixel data, and a Data ID of 1 is set in a case where position information 1404 is held in the payload. Doing so makes it possible to transmit the pixel data and position information of each horizontal line in transmission packets while identifying the data and information, which in turn makes it possible to send position information with a larger amount of data.

Furthermore, with the format illustrated in FIG. 14C, the position information for each horizontal line is not transmitted, and instead, position information that has already undergone computational processing, corresponding to the known subject horizontal lines, is added. In this case, the image stabilization circuit 301 and the camera control circuit 302 illustrated in FIG. 11 have configurations obtained by dividing the configuration illustrated in FIG. 5 or FIG. 8. Although the "computational processing" mentioned here is the averaging, filtering, or the like described in the third embodiment, the position information obtained through the method described in the second embodiment may be used as the position information. At this time, the information may be added at the frame level, rather than at the horizontal line level. Thus in FIG. 14C, a Data ID 1405 is set to 1, and frame position information 1406 is added to the embedded data.

Thus according to the fifth embodiment, the position information of the image stabilization mechanism based on the exposure period of the subject is extracted, and that information is added to the transmitted image data. This makes it possible to calculate an accurate movement amount for the subject without using complicated transmission paths or transmission processes.

Sixth Embodiment

A sixth embodiment of the present invention will be described next with reference to FIGS. 15 to 16.

Figure 15:
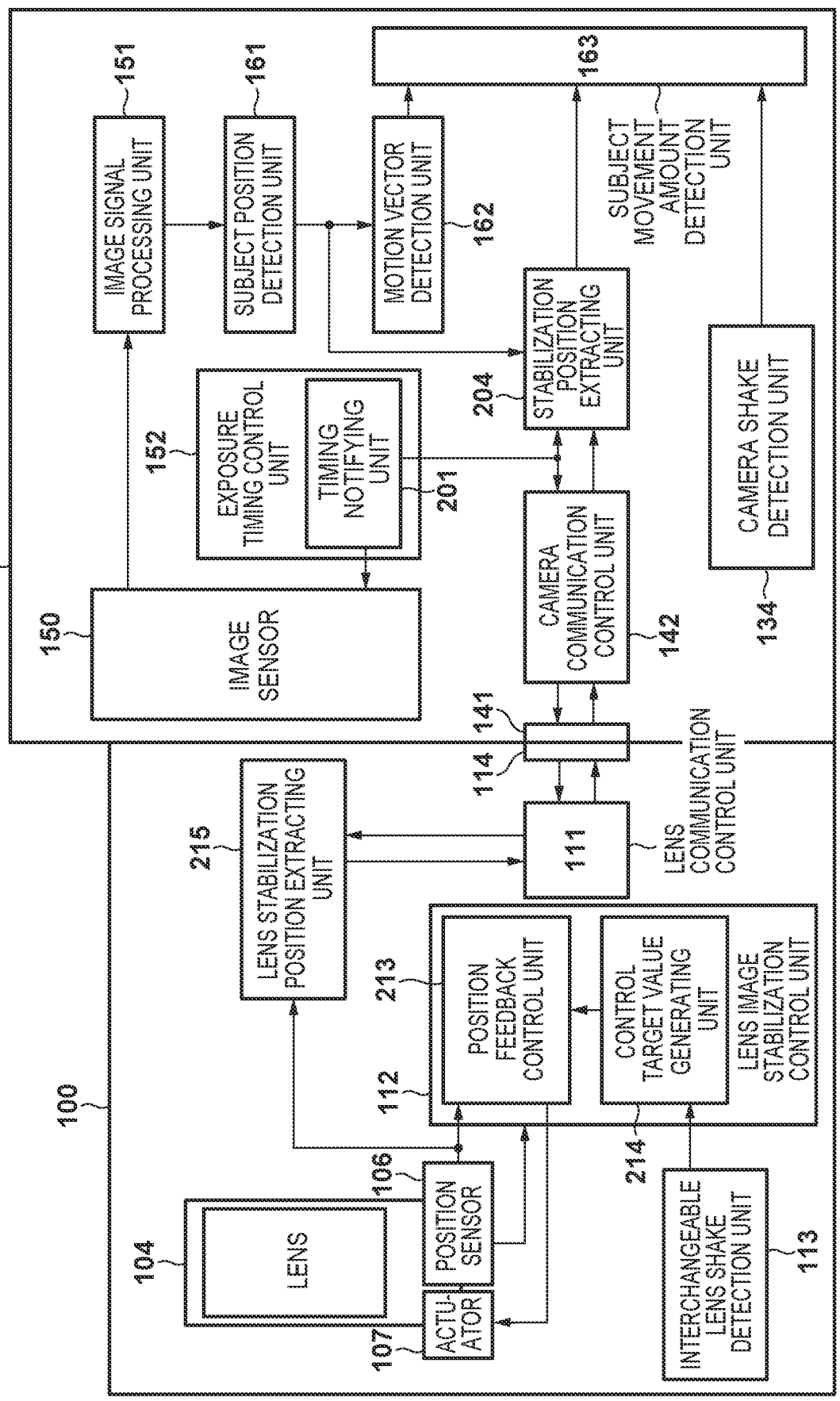
FIG. 15 is a block diagram illustrating, in detail, a configuration involved in a subject movement detection process according to a sixth embodiment.

FIG. 15 is a block diagram illustrating, in further detail, a configuration used for a subject movement detection process according to the sixth embodiment of the present invention. Note that elements that are the same as those illustrated in FIG. 1 are given the same reference numerals, and will not be described. Furthermore, the elements in FIG. 1 not directly related to the subject movement detection process according to the sixth embodiment are not shown.

The lens image stabilization control unit 112 includes a position feedback control unit 213 and a control target value generating unit 214. The control target value generating unit 214 generates a control target value, for carrying out position feedback control with the position feedback control unit 213, on the basis of the output from the interchangeable lens shake detection unit 113. On the basis of the control target value and the position information from the image stabilization lens position sensor 106, the position feedback control unit 213 finds a target position for the image stabilization lens group 104 and calculates an operation amount, and carries out position feedback control, which controls the driving of the image stabilization lens actuator 107. An image stabilization function that suppresses image blur, a smooth panning operation, and the like can be realized using the control target value generated by the control target value generating unit 214.

A lens stabilization position extracting unit 215 extracts position information from the output of the image stabilization lens position sensor 106 at a specific timing, the timing being determined by the timing notifying unit 201 of the exposure timing control unit 152, provided on the camera body 120 side.

The lens stabilization position extracting unit 215 transfers the output of the image stabilization lens position sensor 106, extracted on the basis of the output from the timing notifying unit 201, to a stabilization position extracting unit 204 on the camera body 120 side. As described earlier, the communication between the interchangeable lens 100 and the camera body 120 is carried out by the lens communication control unit 111 and the camera communication control unit 142.

Figure 16:
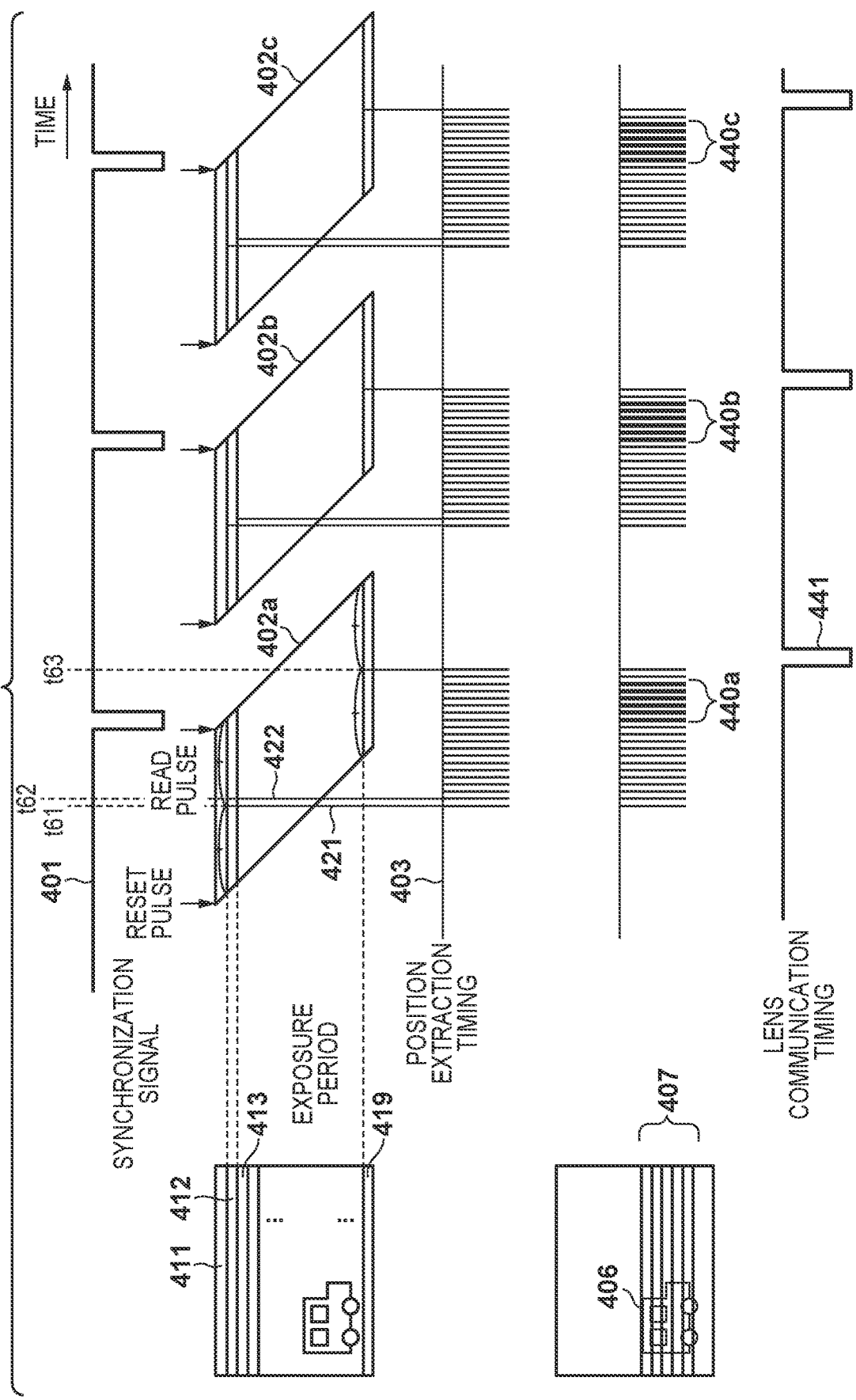
FIG. 16 is a diagram illustrating the timing at which position information of an image stabilization mechanism is extracted, according to the sixth embodiment.

FIG. 16 is a diagram illustrating the timing of the extraction by the lens stabilization position extracting unit 215 according to the sixth embodiment. Note that the same signals and the like as those illustrated in FIGS. 4A and 4B are given the same reference numerals.

In the present embodiment, the timing at which the lens stabilization position extracting unit 215 extracts the position information from the image stabilization lens position sensor 106 is the same as the timing at which the stabilization position extracting unit 204 extracts the position information from the camera stabilization position sensor 131, described with reference to FIGS. 4A and 4B. For example, the position information is extracted at time t61, corresponding to the uppermost horizontal readout line 411. The lens stabilization position extracting unit 215 extracts the position information sequentially in a similar manner, at time t62 corresponding to the horizontal readout line 412, and at time t63 corresponding to the final horizontal readout line 419.

The same applies to the exposure periods 402b and 402c, which are the second and third exposure periods, respectively.

The timing notifying unit 201 notifies the lens stabilization position extracting unit 215 of the extraction timing using the signal 403, and the lens stabilization position extracting unit 215 extracts the position information from the output of the image stabilization lens position sensor 106. The lens stabilization position extracting unit 215 then transfers the obtained position information to the lens communication control unit 111, and the lens communication control unit 111 transmits the information to the camera communication control unit 142 on a frame-by-frame basis at the timing of a communication timing 441.

The camera communication control unit 142 transfers one frame's worth of the position information from the image stabilization lens position sensor 106 to the stabilization position extracting unit 204. The stabilization position extracting unit 204 extracts position information 440a to 440c of the subject exposure periods corresponding to the subject lines 407, which itself corresponds to the subject extracted by the subject position detection unit 161, from the one frame's worth of position information transmitted from the interchangeable lens 100. The extracted position information 440a to 440c is transmitted to the subject movement amount detection unit 163.

The subject movement amount detection unit 163 detects the movement amount of the subject on the basis of the outputs from the motion vector detection unit 162, the stabilization position extracting unit 204, and the camera shake detection unit 134.

According to the sixth embodiment as described thus far, an accurate amount of correction for the image stabilization mechanism can be obtained, which makes it possible to find a more accurate subject movement amount.

Although the present embodiment describes a method of determining the extraction timing for each horizontal readout line in the image sensor 150, the extraction may occur for the horizontal readout line every set interval instead.

Seventh Embodiment

A seventh embodiment of the present invention will be described next with reference to FIGS. 17 to 19.

Figure 17:
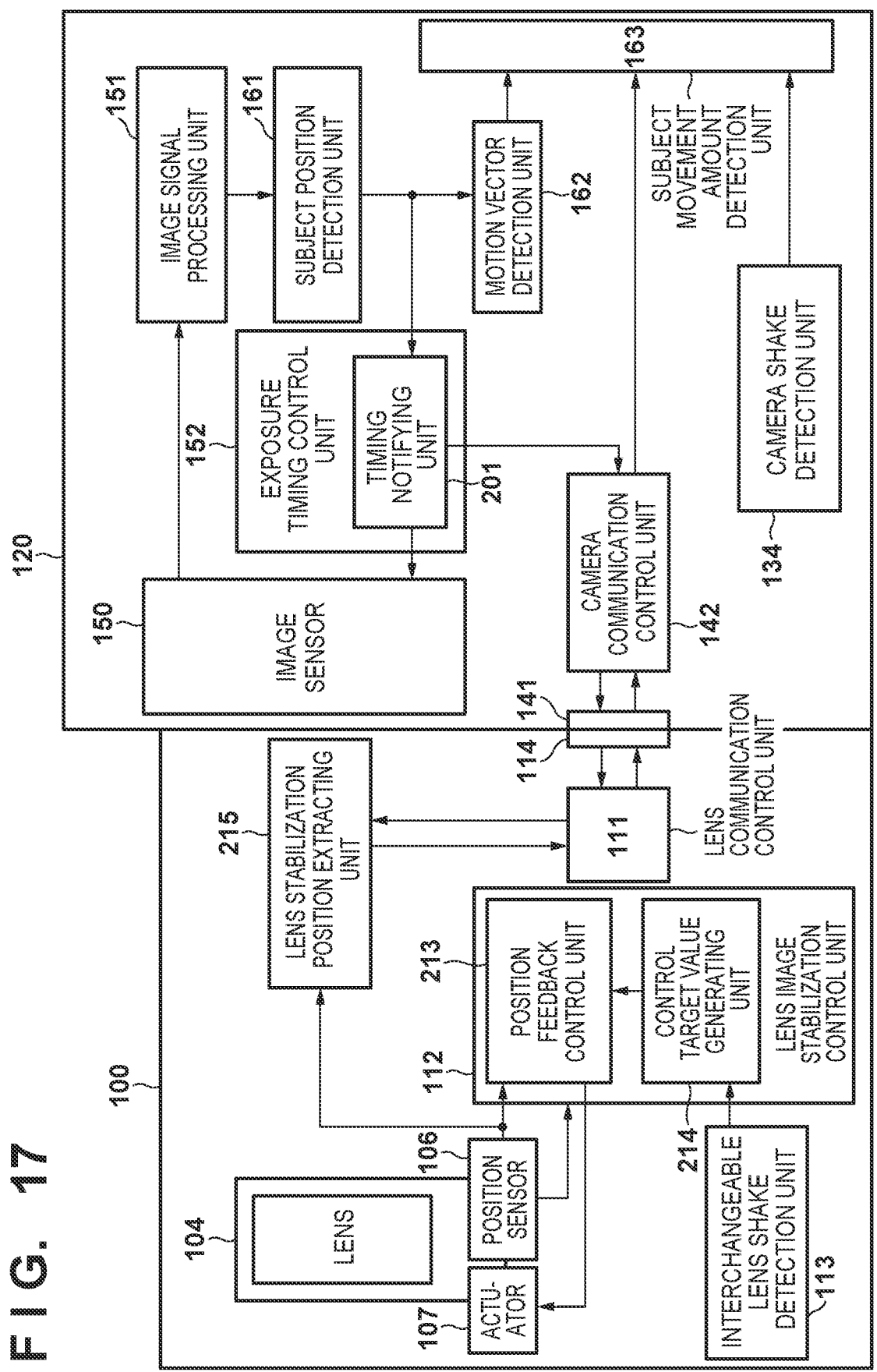
FIG. 17 is a block diagram illustrating, in detail, a configuration involved in a subject movement detection process according to a seventh embodiment.
Figure 18:
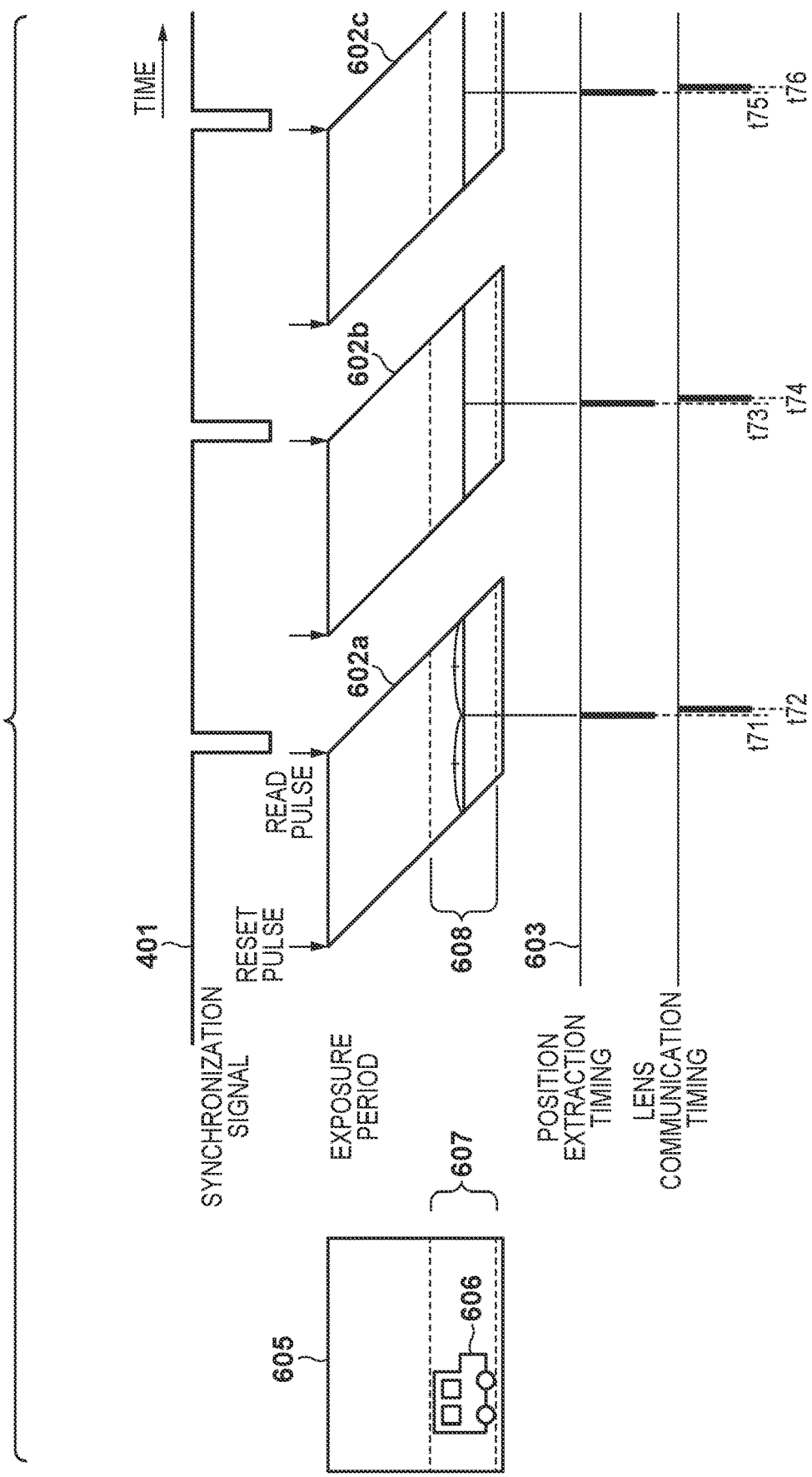
FIG. 18 is a diagram illustrating the timing at which position information of an image stabilization mechanism is extracted, according to the seventh embodiment.

FIG. 17 is a block diagram illustrating, in further detail, a configuration used for a subject movement detection process according to the seventh embodiment of the present invention. Note that elements that are the same as those illustrated in FIG. 15 are given the same reference numerals, and will not be described. The configuration illustrated in FIG. 17 is different from the configuration illustrated in FIG. 15 in that the camera body 120 does not include the stabilization position extracting unit 204.

Control according to the seventh embodiment will be described with reference to FIG. 18. In the seventh embodiment, the position information from the image stabilization lens position sensor 106 is extracted at the timing described in the second embodiment with reference to FIG. 6. The timing notifying unit 201 outputs the signal 603 indicating the timing at which the position information from the camera stabilization position sensor 131 is to be extracted, and the signal 603 is transmitted to the lens communication control unit 111 from the camera communication control unit 142 through lens communication.

On the basis of the signal 603, the lens stabilization position extracting unit 215 extracts the position information from the image stabilization lens position sensor 106 at time t71 in the exposure period 602a, at time t73 in the exposure period 602b, and at time t74 in the exposure period 602c. The lens stabilization position extracting unit 215 then transmits the position information to the camera communication control unit 142 via the lens communication control unit 111, with the position information extracted at time t71 being transmitted at time t72, the position information extracted at time t73 being transmitted at time t74, and the position information extracted at time t75 being transmitted at time t76.

Figure 19:
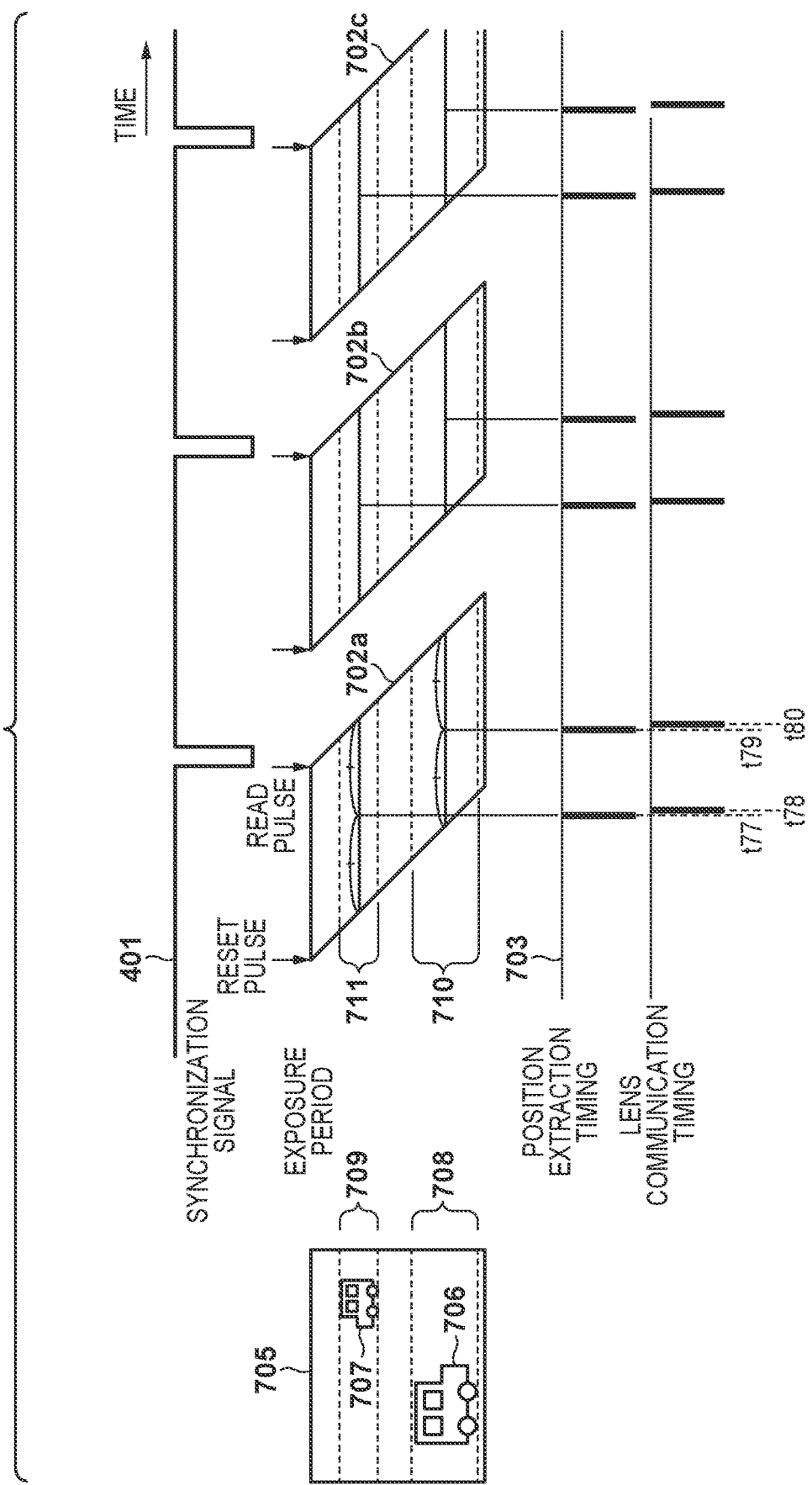
FIG. 19 is a diagram illustrating the timing at which position information of an image stabilization mechanism is extracted, in a case where there are a plurality of subjects, according to the seventh embodiment.

FIG. 19 illustrates the extraction timing when the two subjects 706 and 707 are present in the shot image 705. The position information from the image stabilization lens position sensor 106 is extracted at the timing described with reference to FIG. 7. The timing notifying unit 201 outputs the signal 703 indicating the timing at which the position information from the camera stabilization position sensor 131 is to be extracted, and the signal 703 is transmitted to the lens communication control unit 111 from the camera communication control unit 142 through lens communication.

In the exposure period 702a, the lens stabilization position extracting unit 215 extracts the position information from the image stabilization lens position sensor 106 at time t77, which corresponds to the subject 707, on the basis of the signal 603. The extracted position information is then transmitted to the camera communication control unit 142 via the lens communication control unit 111 at time t78. Furthermore, the position information from the image stabilization lens position sensor 106 is extracted at time t79, corresponding to the subject 706, and the extracted position information is transmitted to the camera communication control unit 142 via the lens communication control unit 111 at time t80. The position information is extracted and transmitted through the same processing in the exposure periods 702b and 702c as well.

The position information from the image stabilization lens position sensor 106, which is transmitted in this manner, is transmitted to the subject movement amount detection unit 163 and used to detect the movement amount of the subject.

According to the seventh embodiment as described thus far, an accurate amount of correction for the image stabilization mechanism can be obtained, which makes it possible to find a more accurate subject movement amount.

Eighth Embodiment

An eighth embodiment of the present invention will be described next with reference to FIGS. 20 and 21.

Figure 20:
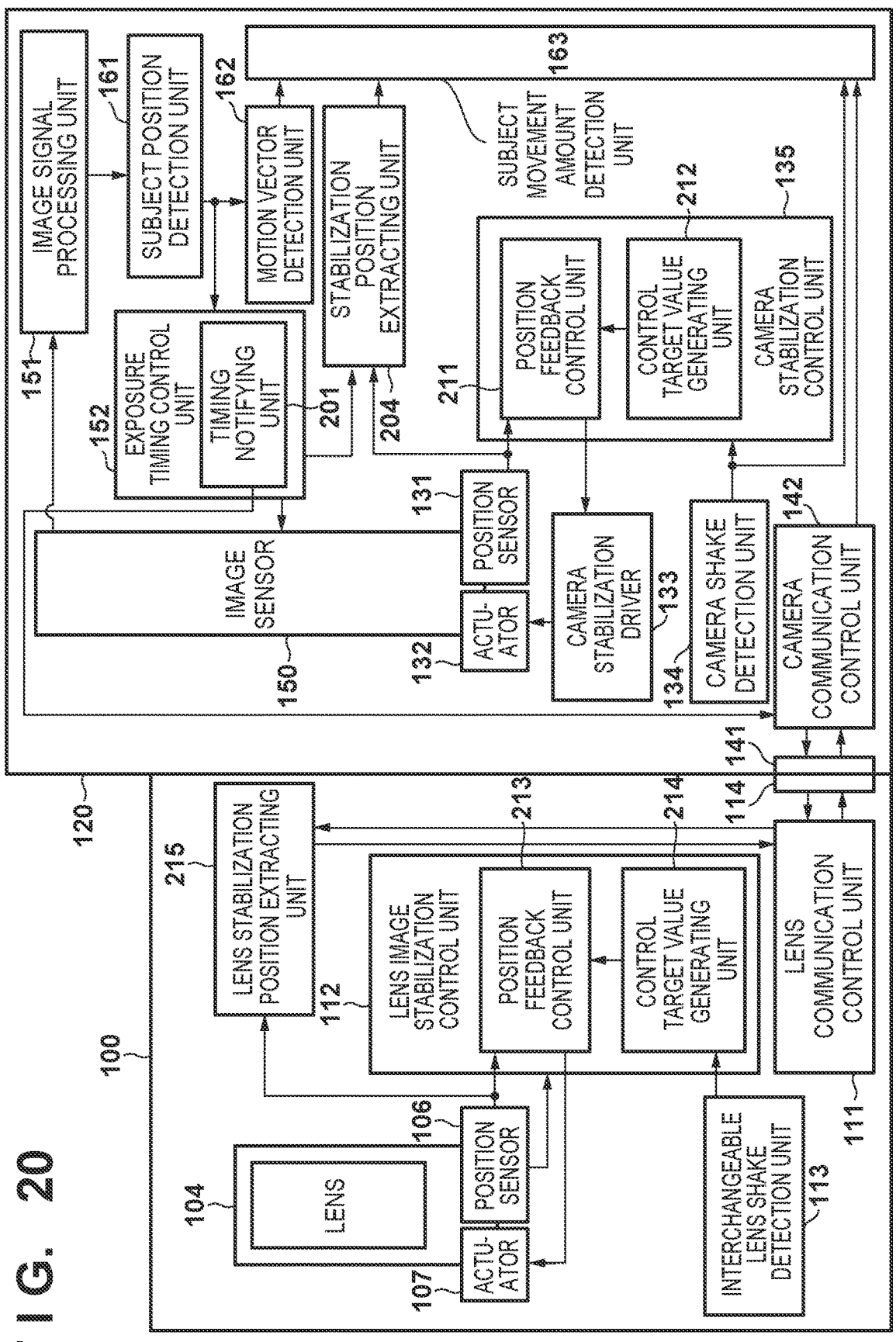
FIG. 20 is a block diagram illustrating, in detail, a configuration involved in a subject movement detection process according to an eighth embodiment.

FIG. 20 is a block diagram illustrating, in further detail, a configuration used for a subject movement detection process according to the eighth embodiment of the present invention. According to the configuration illustrated in FIG. 20, the position information from the image stabilization lens position sensor 106 is extracted at the timing described with reference to FIG. 18 or 19, image stabilization is carried out using the image sensor 150, and the position information from the camera stabilization position sensor 131 is extracted at the timing described with reference to FIG. 6 or 7. In FIG. 20, elements that are the same as those illustrated in FIGS. 5 and 15 are given the same reference numerals, will not be described. Furthermore, the elements in FIG. 1 not directly related to the subject movement detection process according to the eighth embodiment are not shown.

Control according to the eighth embodiment will be described with reference to FIG. 21. Like FIG. 18 described in the seventh embodiment, a situation where a single subject 606 has been detected will be described here.

Figure 21:
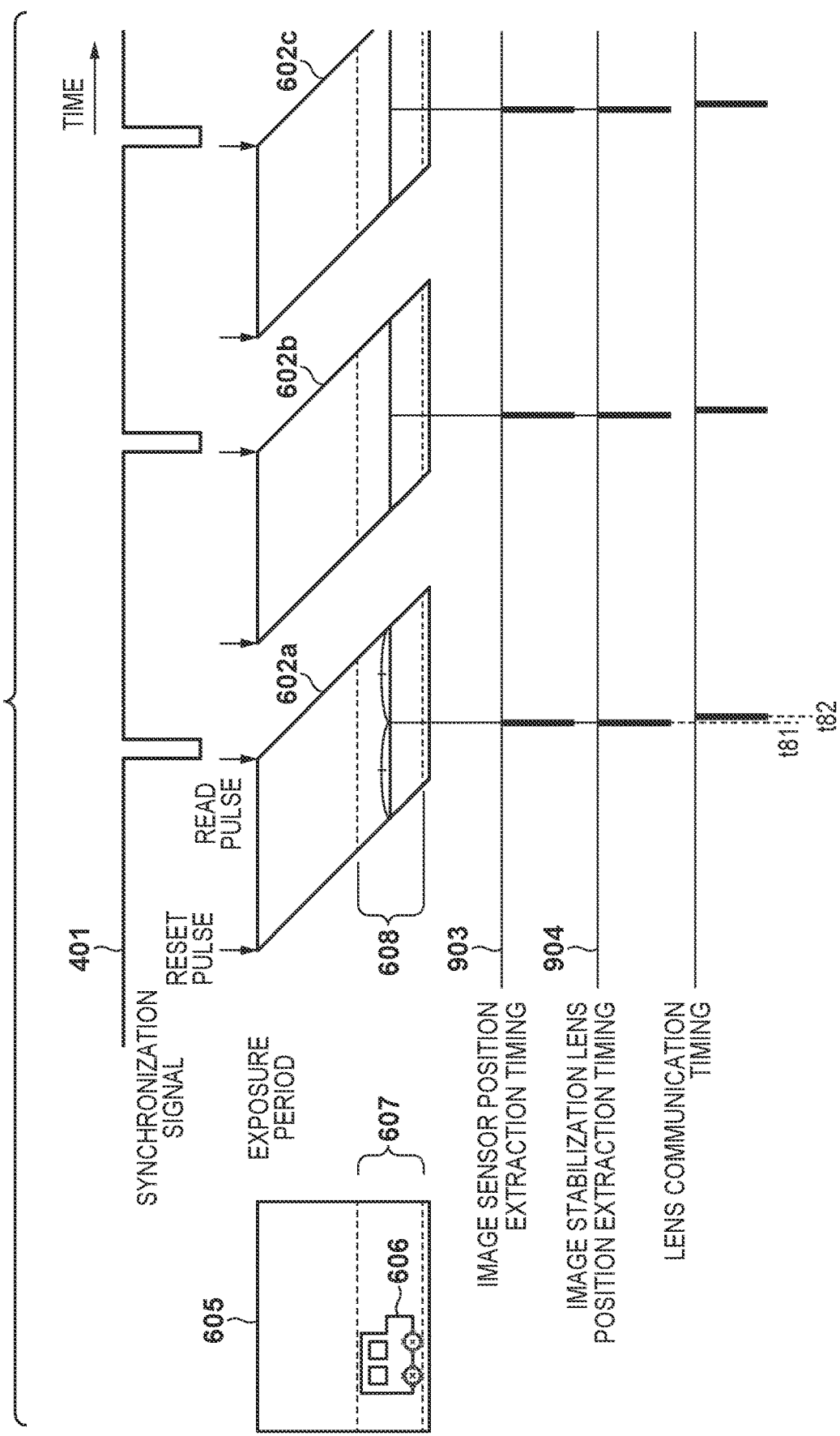
FIG. 21 is a diagram illustrating the timing at which position information of image stabilization mechanisms is extracted, according to the eighth embodiment.

As illustrated in FIG. 21, the camera stabilization position sensor 131 and the image stabilization lens position sensor 106 extract the position information at the same timing. Furthermore, like the example illustrated in FIG. 6, the timing notifying unit 201 determines time t81, which coincides with the center of the subject exposure period 608, as the extraction timing, and outputs the signal 903 to the stabilization position extracting unit 204. In response to the signal 903, the stabilization position extracting unit 204 extracts the position information from the camera stabilization position sensor 131 at time t81, and transmits the extracted position information to the subject movement amount detection unit 163.

On the other hand, the timing notifying unit 201 transmits a signal 904, for causing the position information to be extracted at time t81, to the lens communication control unit 111 from the camera communication control unit 142, through lens communication. In response to the signal 904, the lens stabilization position extracting unit 215 extracts the position information from the image stabilization lens position sensor 106 at time t81, and passes the extracted position information to the lens communication control unit 111. The lens communication control unit 111 transmits the information of the image stabilization lens position sensor 106 to the camera communication control unit 142 at time t82, through lens communication. The camera communication control unit 142 transmits the received information to the subject movement amount detection unit 163. The above-described processing is carried out for the exposure periods 602b and 602c as well.

The subject movement amount detection unit 163 obtains the motion vector calculated from the image from the motion vector detection unit 162. The shake amount of the image capturing apparatus is obtained from the camera shake detection unit 134. Furthermore, the position information of the image stabilization mechanism is obtained from the stabilization position extracting unit 204 and the lens stabilization position extracting unit 215. The accurate position information of the subject can be found from this information.

According to the eighth embodiment as described thus far, extracting the position information of the image stabilization mechanisms in accordance with the exposure period of a subject makes it possible to find an accurate amount of correction for the image stabilization mechanisms, corresponding to that exposure, in an interchangeable lens-type image capturing apparatus. An accurate movement amount of the subject can be found as a result.

Note that control may be carried out so that the position information is extracted at the timings illustrated in FIGS. 4A, 4B, and 7.

Ninth Embodiment

A ninth embodiment of the present invention will be described next with reference to FIGS. 22 and 23.

Figure 22:
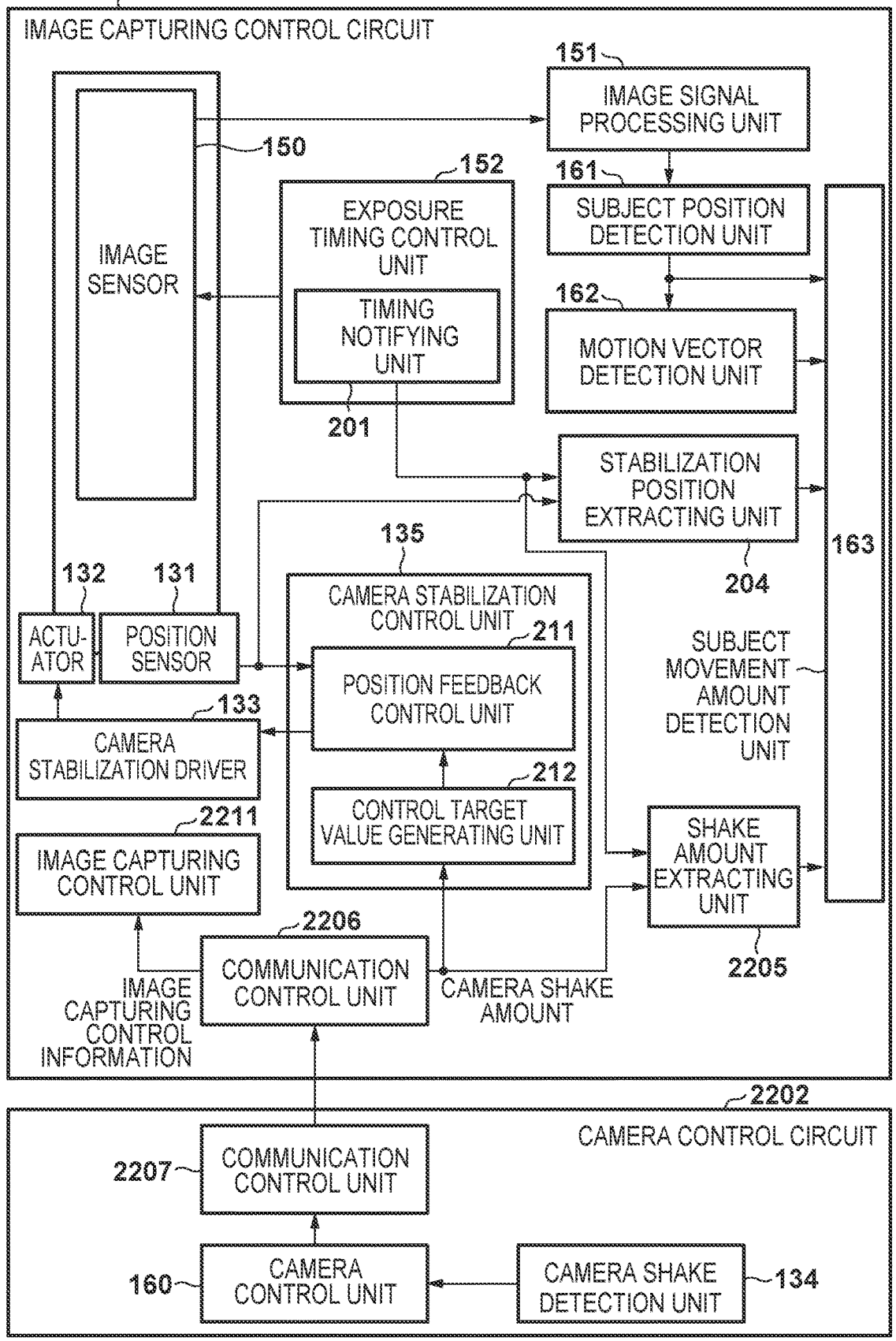
FIG. 22 is a block diagram illustrating, in detail, a configuration involved in a subject movement detection process according to ninth and tenth embodiments.
Figure 23:
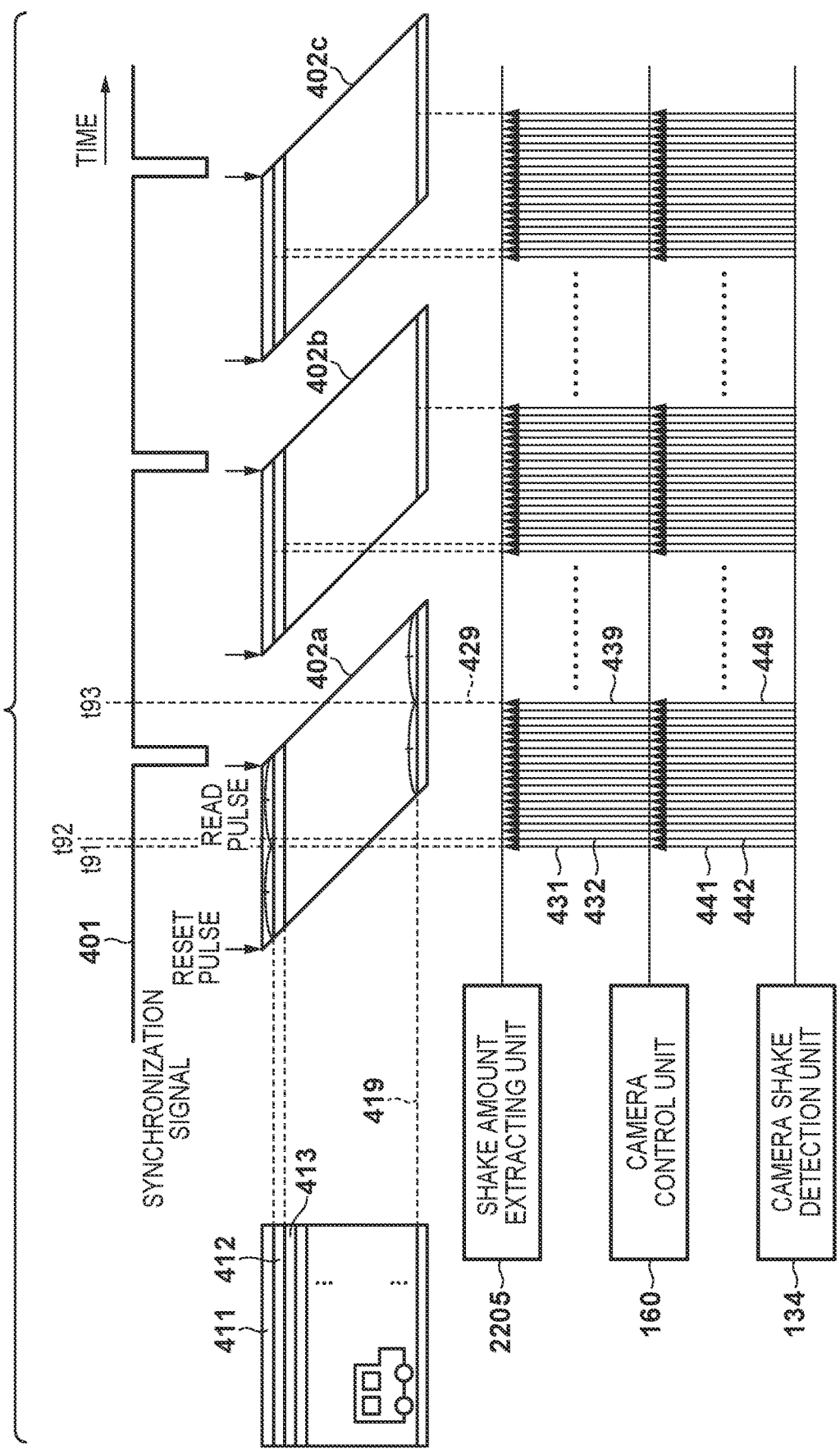
FIG. 23 is a diagram illustrating the timing at which camera shake amounts from a camera shake detection unit are extracted, according to the ninth embodiment.

FIG. 22 is a block diagram illustrating, in further detail, a configuration used for a subject movement detection process according to the ninth embodiment of the present invention. Note that elements that are the same as those illustrated in FIGS. 1 and 3 are given the same reference numerals, and will not be described. Furthermore, the elements in FIG. 1 not directly related to the subject movement detection process according to the ninth embodiment are not shown.

An image capturing control circuit 2201 is a circuit block including the image sensor 150, the camera stabilization control unit 135, the motion vector detection unit 162, the subject movement amount detection unit 163, and the like, and is formed on a single circuit board or semiconductor device. A camera control circuit 2202 is a circuit block including the camera control unit 160, the camera shake detection unit 134, and the like, and is formed on a different circuit board or semiconductor device from the image capturing control circuit 2201.

An image capturing control unit 2211 is a processing block that controls the image sensor 150, the exposure timing control unit 152, the image signal processing unit 151, and the like, and sets the shooting conditions such as the exposure period, a pixel readout algorithm for the image sensor 150, and the like.

A communication control unit 2206 and a communication control unit 2207 are communication blocks for passing image capturing control information from the camera control unit 160 to the image capturing control unit 2211. The communication control unit 2206 and the communication control unit 2207 are used to pass a camera shake amount output by the camera shake detection unit 134 from the camera control unit 160 to the camera stabilization control unit 135 and a shake amount extracting unit 2205. For example, if the image capturing control information and the camera shake amount are transferred via separate communication circuits, communication circuits and lines are required for both. This is a problem in that it increases the space required for wiring, the number of connector pins, and the like on the circuit board, which increases the component costs and makes it difficult to keep the image capturing apparatus small. In the present embodiment, an increase in the circuit scale and component cost are suppressed by transferring the image capturing control information and the camera shake amount via the same communication circuit.

The shake amount extracting unit 2205 extracts the camera shake amount output from the camera shake detection unit 134 at a specific timing. The timing is determined by the output of the timing notifying unit 201 included in the exposure timing control unit 152.

Next, the camera shake amount output from the camera shake detection unit 134, and the timing of the extraction by the shake amount extracting unit 2205, in a case where the present embodiment is applied, will be described with reference to FIG. 23. Note that the same signals and the like as those illustrated in FIGS. 4A and 4B are given the same reference numerals.

The camera shake detection unit 134 transmits the detected camera shake amount to the camera control unit 160 at predetermined intervals. In the example illustrated in FIG. 23, the camera shake amount is transmitted from the camera shake detection unit 134 to the camera control unit 160 at the communication timings 441, 442, and so on up to 449, in that order.

The camera control unit 160 transmits the received camera shake amounts to the shake amount extracting unit 2205 in sequence. In the example illustrated in FIG. 23, the camera shake amount received at the communication timing 441 is transmitted from the camera control unit 160 to the shake amount extracting unit 2205 at the communication timing 431. Likewise, the camera shake amount received at the communication timing 442 is transmitted from the camera control unit 160 to the shake amount extracting unit 2205 at the communication timing 432; and the camera shake amount received at the communication timing 449, at the communication timing 439.

The shake amount extracting unit 2205 extracts a camera shake amount on the basis of the output from the timing notifying unit 201, from among the received camera shake amounts. As described with reference to FIGS. 4A and 4B, in the ninth embodiment, the extraction timing is set to the central time corresponding to the center of the exposure period of each horizontal readout line in the image sensor 150. For example, with the uppermost horizontal readout line 411, the central time of the exposure period is time t91, and thus the timing notifying unit 201 notifies the shake amount extracting unit 2205 of time t91. The shake amount extracting unit 2205 then extracts the camera shake amount received at the communication timing 431 as the camera shake amount corresponding to time t91.

Likewise, for the horizontal readout line 412, the shake amount extracting unit 2205 extracts the camera shake amount received at the communication timing 432 as the camera shake amount corresponding to time t92. Furthermore, for the horizontal readout line 419, the shake amount extracting unit 2205 extracts the camera shake amount received at the communication timing 439 as the camera shake amount corresponding to time t93. This extraction process is the same for the exposure periods 402b and 402c, which are the second and third exposure periods, respectively.

The stabilization position extracting unit 204 also extracts the position information output from the camera stabilization position sensor 131 at the same timing as the shake amount extracting unit 2205, on the basis of the signal from the timing notifying unit 201, and transmits the extracted position information to the subject movement amount detection unit 163.

According to the ninth embodiment as described above, the camera shake amount corresponding to each horizontal readout line can be found for each of those horizontal readout lines, and the accuracy with which the subject movement amount is detected can be improved as a result.

Note that the stabilization position extracting unit 204 and the shake amount extracting unit 2205 may be controlled to extract the position information and the camera shake amount at the timings indicated in FIG. 6 or FIG. 7 instead.

Tenth Embodiment

A tenth embodiment of the present invention will be described next with reference to FIG. 24. Note that the configuration of the image capturing apparatus according to the present embodiment is the same as that illustrated in FIGS. 1 and 22, and will therefore not be described.

Figure 24:
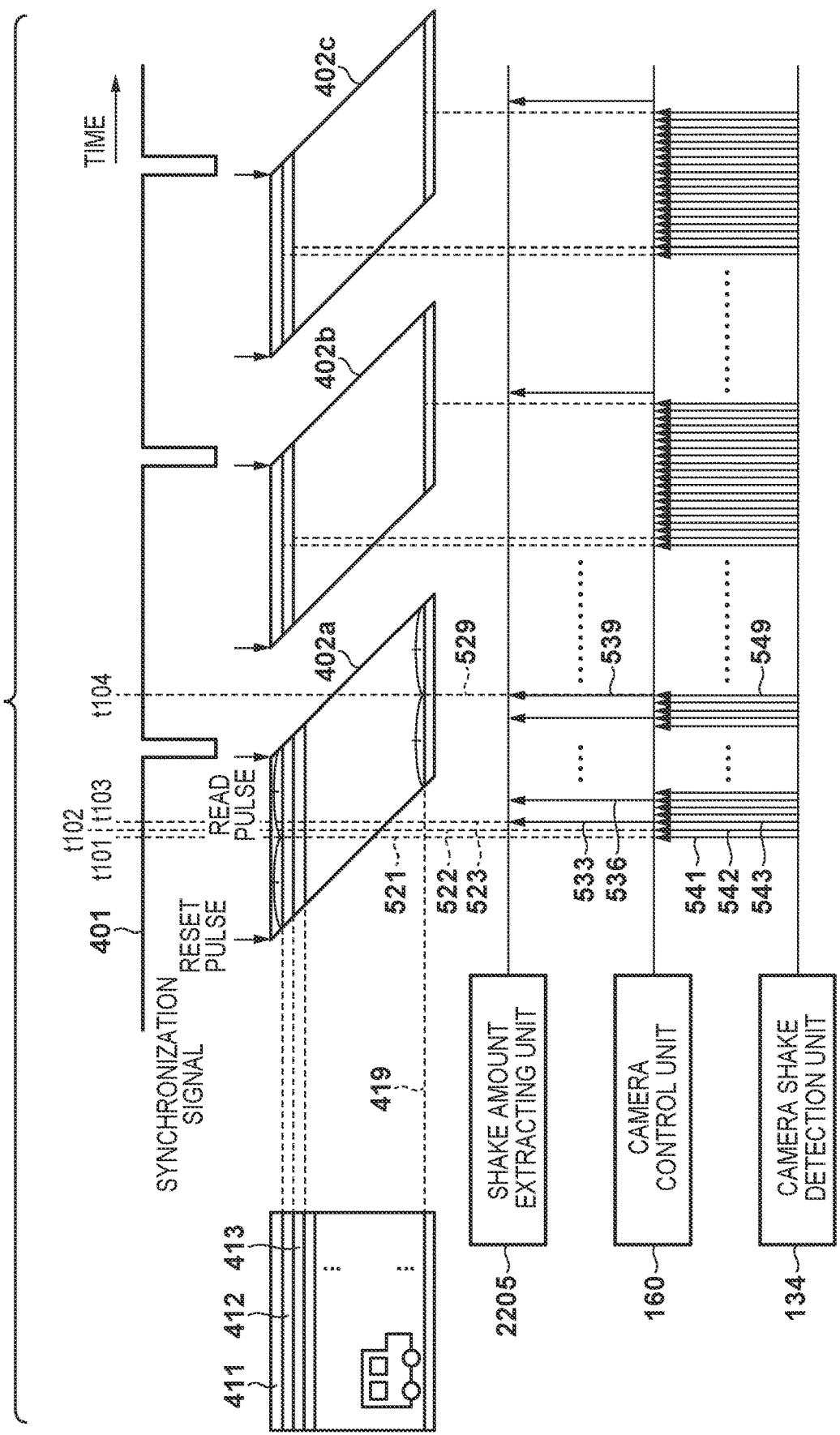
FIG. 24 is a diagram illustrating the timing at which camera shake amounts from a camera shake detection unit are extracted, according to the tenth embodiment.

FIG. 24 is a diagram illustrating the timing of the extraction by the shake amount extracting unit 2205 according to the tenth embodiment. Note that timings that are the same as those illustrated in FIG. 23, described above, will be given the same reference signs.

The camera shake detection unit 134 transmits the detected camera shake amount to the camera control unit 160 at predetermined intervals. In the example illustrated in FIG. 24, the camera shake amount is transmitted from the camera shake detection unit 134 to the camera control unit 160 at a communication timing 541, a communication timing 542, a communication timing 543, and so on up to a communication timing 549, in that order.

The camera control unit 160 includes memory such as RAM (not shown) for temporarily storing various types of data, and stores the received camera shake amounts in the memory. The camera control unit 160 then transmits the camera shake amounts stored over a predetermined period to the shake amount extracting unit 2205 all at once. In FIG. 24, the camera control unit 160 transmits the camera shake amounts received at the communication timings 541 to 543 all at once to the shake amount extracting unit 2205 at the communication timing 533. Likewise, the camera shake amounts from a predetermined period are transmitted from the camera control unit 160 all at once to the shake amount extracting unit 2205, at the communication timings 536 to 539, in that order.

The shake amount extracting unit 2205 extracts a camera shake amount on the basis of the output from the timing notifying unit 201, from the camera shake amounts received all at once. Like the ninth embodiment, in the tenth embodiment, the extraction timing is set to the central time corresponding to the center of the exposure period of each horizontal readout line in the image sensor 150. For example, with the uppermost horizontal readout line 411, the central time of the exposure period is time t101, and thus the timing notifying unit 201 notifies the shake amount extracting unit 2205 of time t101.

In the same manner, the timing notifying unit 201 notifies the shake amount extracting unit 2205 of time t102, which corresponds to the horizontal readout line 412, and time t103, which corresponds to the horizontal readout line 413. The shake amount extracting unit 2205 extracts the camera shake amounts corresponding to time t101, time t102, time t103, and time t104 from the camera shake amounts received all at once at the communication timing 533. Likewise, the shake amount extracting unit 2205 extracts the camera shake amount corresponding to the exposure period of each horizontal readout line, from the camera shake amounts received all at once at the communication timings 536 to 539. This extraction process is the same for the exposure periods 402b and 402c, which are the second and third exposure periods, respectively.

The stabilization position extracting unit 204 also extracts the position information output from the camera stabilization position sensor 131 at the same timing as the shake amount extracting unit 2205, on the basis of the signal from the timing notifying unit 201, and transmits the extracted position information to the subject movement amount detection unit 163.

The communication of the image capturing control information and the camera shake amount is carried out through the communication control unit 2206 and the communication control unit 2207, and thus control for ensuring that the communication timings of the image capturing control signals and the camera shake amounts do not overlap is necessary. According to the present embodiment, communicating the camera shake amounts all at once makes it easy to control the communication timings of the image capturing control signals and the camera shake amounts.

Note that the stabilization position extracting unit 204 and the shake amount extracting unit 2205 may be controlled to extract the position information and the camera shake amount at the timings indicated in FIG. 6 or FIG. 7 instead.

Although the present embodiment describes a configuration in which the camera shake amounts from a predetermined period are transmitted all at once, the configuration may be such that camera shake amounts corresponding to a single frame are transmitted all at once. A configuration is also possible in which the camera shake amounts corresponding to the exposure periods of a single frame are transmitted all at once. For example, the camera shake amounts need not be transmitted to the camera stabilization control unit 135 when the stabilization control is off in the main body. Doing so makes it possible to reduce the frequency at which the camera shake amount is transmitted from the camera control unit 160 to the shake amount extracting unit 2205. Note that in FIG. 24, the camera shake amounts corresponding to the exposure period of a single frame correspond to the camera shake amounts detected in the period from the communication timing 541 to the communication timing 549.

Furthermore, although the present embodiment describes a configuration in which the camera shake amounts from a predetermined period are transmitted all at once, the configuration may be such that the setting for that predetermined period is changed on the basis of the subject movement amount. For example, if the detection result from the subject movement amount detection unit 163 indicates a high subject movement amount, the predetermined period may be shortened in anticipation of an increased camera shake amount. On the other hand, if the subject movement amount is low, the predetermined period may be lengthened in anticipation of a reduced camera shake amount.

According to the tenth embodiment as described thus far, a camera shake amount corresponding to the exposure period of the subject can be extracted, which makes it possible to improve the accuracy at which the subject movement amount is detected. Furthermore, the camera shake amount can be passed to the subject movement amount detection unit using a configuration that suppresses an increase in the circuit scale and the component cost.

Note that the stabilization position extracting unit 204 and the shake amount extracting unit 2205 may be controlled to extract the position information and the camera shake amount at the timings indicated in FIG. 6 or FIG. 7 instead.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188608, filed on Oct. 3, 2018 which is hereby incorporated by reference herein in its entirety.

What is claimed is:

1. An image stabilizing apparatus comprising:
   a shake detector that detects shake;
   an image stabilizer that corrects the shake by moving a position of the image stabilizer on the basis of the shake detected by the shake detector;
   a position detector that detects and outputs the position of the image stabilizer at least during a first period which is a period while the image stabilizer is driven;
   a determinator that determines a first timing included in the first period on the basis of a timing at which an image sensor which shoots an image is exposed; and
   an extractor that extracts the position of the image stabilizer, from the output of the position detector during the first period, at the first timing determined by the determinator.

2. The image stabilizing apparatus according to claim 1, wherein a plurality of pixels are arranged in the image sensor in a matrix; and
   the determinator determines a central time of an exposure period for each line in the image sensor as the first timing.

3. The image stabilizing apparatus according to claim 1, wherein a plurality of pixels are arranged in the image sensor in a matrix; and
   the determinator determines a central time of an exposure period for each line at a set interval, among the lines in the image sensor, as the first timing.

4. The image stabilizing apparatus according to claim 1, further comprising:
   a subject position detector that detects a position of a subject from an image captured by the image sensor,
   wherein a plurality of pixels are arranged in the image sensor in a matrix; and
   for each subject detected by the subject position detector, the determinator determines a central time of an exposure period of a line including the subject as the first timing for that subject.

5. The image stabilizing apparatus according to claim 1, further comprising:
   a smoothing circuit that carries out a smoothing process on time series information of the position of the image stabilizer output from the position detector,
   wherein the extractor extracts the position of the image stabilizer at the first timing determined by the determinator, from the smoothed time series information of the position of the image stabilizer.

6. The image stabilizing apparatus according to claim 1, wherein the image stabilizer is an image sensor, and
   wherein the position detector detects and outputs the position of the image sensor during the first period.

7. The image stabilizing apparatus according to claim 1, further comprising:
   a second shake detector that detects shake;
   a second image stabilizer that corrects the shake by moving a position on the basis of the shake detected by the second shake detector;
   a second position detector that detects and outputs the position of the second image stabilizer during a second period that includes the first timing; and
   a second extractor that extracts the position of the second image stabilizer, from the output of the second position detector during the second period, at the first timing determined by the determinator.

8. The image stabilizing apparatus according to claim 7, wherein the second image stabilizer is an image stabilization lens, and
wherein the position detector detects and outputs the position of the image stabilization lens during the first period.

9. The image stabilizing apparatus according to claim 7, wherein the image stabilizing apparatus is provided in an image capturing system constituted by a main body of an image capturing apparatus and an interchangeable lens;
the interchangeable lens includes the second shake detector, the second image stabilizer, the second position detector, and the second extractor, and the main body of the image capturing apparatus includes the image sensor and the determinator; and
the apparatus further comprises communication circuits one of which transmits the first timing determined by the determinator to the interchangeable lens, and the other of which transmits the position of the second image stabilizer extracted by the second extractor to the main body of the image capturing apparatus.

10. The image stabilizing apparatus according to claim 1, wherein the image stabilizer is an image stabilization lens, and
wherein the position detector detects and outputs the position of the image stabilization lens during the first period.

11. The image stabilizing apparatus according to claim 10, wherein the image stabilizing apparatus is provided in an image capturing system constituted by a main body of an image capturing apparatus and an interchangeable lens;
the interchangeable lens includes the shake detector, the image stabilizer, the position detector, and the extractor, and the main body of the image capturing apparatus includes the image sensor and the determinator; and
the apparatus further comprises communication circuits one of which transmits the first timing determined by the determinator to the interchangeable lens, and the other of which transmits the position of the image stabilizer extracted by the extractor to the main body of the image capturing apparatus.

12. The image stabilizing apparatus according to claim 1, further comprising:
a third extractor that extracts the output of the shake detector at the first timing determined by the determinator.

13. The image stabilizing apparatus according to claim 12,
wherein the shake detector is formed on a different circuit board from the determinator and the third extractor; and
the apparatus further comprises a communication circuit that transmits information of the shake detected by the shake detector to the third extractor.

14. The image stabilizing apparatus according to claim 13,
wherein the communication circuit transmits the information of the shake sequentially to the third extractor.

15. The image stabilizing apparatus according to claim 13,
wherein the communication circuit transmits the information of the shake obtained in each predetermined period to the third extractor all at once.

16. The image stabilizing apparatus according to claim 1, wherein the image stabilizing apparatus is formed on the same circuit board as the image sensor.

17. The image stabilizing apparatus according to claim 1, further comprising:
a generator that generates a packet, containing a payload and a header, the packet including pixel data of an image captured by the image sensor in which a plurality of pixels are arranged in a matrix, and information of the position of the image stabilizer extracted by the extractor; and
a transmitter that transmits the packet generated by the generator.

18. The image stabilizing apparatus according to claim 17,
wherein the generator inserts the pixel data from each line of the image sensor into the payload of a corresponding packet, and inserts the information of the position of the image stabilizer extracted by the extractor in the exposure period of that line into the header of the same packet.

19. The image stabilizing apparatus according to claim 17,
wherein on the basis of the output of the position detector, the generator finds a reference position of the image stabilizer in each of frames and a difference between the position of the image stabilizer and the reference position, inserts the pixel data of each line in the image sensor or information of the reference position into the payload of each packet, and inserts information of the difference into the header of the line corresponding to the first timing at which the position of the image stabilizer was extracted.

20. The image stabilizing apparatus according to claim 17,
wherein the generator inserts the pixel data of each line in the image sensor or information of the position of the image stabilizer into the payload of each packet, and inserts, into the header of each packet, information indicating which of the pixel data of each line in the image sensor or the information of the position of the image stabilizer is inserted into the payload.

21. The image stabilizing apparatus according to claim 17,
wherein the image sensor includes a dummy region that does not output pixel data; and
the generator inserts information of the position of the image stabilizer into the payload of a packet corresponding to the dummy region, and inserts, into the header of that packet, information indicating that the information of the position of the image stabilizer has been inserted.

22. The image stabilizing apparatus according to claim 1, wherein the extractor extracts only the position of the image stabilizer at the first timing or intermittently extracts the position of the image stabilizer at a plurality of timings including the first timing from the output of the position detector during the first period.

23. An image processing apparatus comprising:
a motion vector detector that detects a motion vector indicating movement of a subject on the basis of an image captured by an image sensor; and
an acquisition circuit that acquires the motion vector detected by the motion vector detector and information from an image stabilizing apparatus;
a moving amount detector that detects a movement amount of the subject on the basis of the information acquired by the acquisition circuit,
wherein the image stabilization apparatus comprising:
a shake detector that detects shake;

an image stabilizer that corrects the shake by moving a position of the image stabilizer on the basis of the shake detected by the shake detector;

a position detector that detects and outputs the position of the image stabilizer at least during a first period which is a period while the image stabilizer is driven;

a determinator that determines an first timing included in the first period on the basis of a timing at which an image sensor which shoots an image is exposed; and an extractor that extracts the position of the image stabilizer, from the output of the position detector during the first period, at the first timing determined by the determinator, and wherein the information includes a shake amount detected by the shake detector and the position of the image stabilizer extracted by the extractor.

24. A method of detecting a position of an image stabilizer, the method comprising:

detecting shake;

correcting the shake by moving the position of the image stabilizer on the basis of the detected shake;

detecting and outputting the position of the image stabilizer at least during a first period which is a period while the image stabilizer is driven;

determining an first timing included in the first period on the basis of a timing at which an image sensor which shoots an image is exposed; and extracting, from the detected position of the image stabilizer, the position of the image stabilizer during the first period at the determined first timing.

25. A non-transitory computer-readable storage medium storing a program that, in an image stabilizing apparatus including a shake detector that detects shake, an image stabilizer that corrects the shake by moving a position on the basis of the shake detected by the shake detector, and a position detector that detects and outputs the position of the image stabilizer at least during a first period which is a period while the image stabilizer is driven, causes a computer to function as:

a determinator that determines a first timing included in the first period on the basis of a timing at which an image sensor which shoots an image is exposed; and an extractor that extracts the position of the image stabilizer, from the output of the position detector during the first period, at the first timing determined by the determinator.

* * * * *